US011097431B2

(12) United States Patent
Keeney-Ritchie

(10) Patent No.: US 11,097,431 B2
(45) Date of Patent: Aug. 24, 2021

(54) ROBOT NECK MECHANISM

(71) Applicant: Misty Robotics, Inc., Boulder, CO (US)

(72) Inventor: Miles Keeney-Ritchie, Louisville, CO (US)

(73) Assignee: Misty Robotics, Inc., Boulder, CO (US)

( * ) Notice: Subject to any disclaimer, the term of this patent is extended or adjusted under 35 U.S.C. 154(b) by 2 days.

(21) Appl. No.: 16/400,219

(22) Filed: May 1, 2019

(65) Prior Publication Data

US 2019/0337166 A1 Nov. 7, 2019

Related U.S. Application Data

(60) Provisional application No. 62/665,370, filed on May 1, 2018.

(51) Int. Cl.
*B25J 17/02* (2006.01)
*B25J 9/00* (2006.01)
*B25J 9/12* (2006.01)

(52) U.S. Cl.
CPC ......... *B25J 17/0283* (2013.01); *B25J 9/0006* (2013.01); *B25J 9/0009* (2013.01); *B25J 9/126* (2013.01)

(58) Field of Classification Search
CPC .... B25J 9/0006; B25J 9/0009; B25J 17/0258; B25J 17/0283; A63H 13/005; A63H 13/02; A63H 13/04
See application file for complete search history.

(56) References Cited

U.S. PATENT DOCUMENTS 7,013,201 B2 * 3/2006 Hattori ................. B62D 57/032
180/8.1
7,942,221 B1 * 5/2011 Tilden .................. B62D 57/032
180/8.6
(Continued)

FOREIGN PATENT DOCUMENTS

JP 2005-161441 A 6/2005
KR 10-2009-0069356 A 7/2009
(Continued)

OTHER PUBLICATIONS

English translation of KR 2012-0131260 submitted with IDS, 2012.*
(Continued)

*Primary Examiner* — Bobby Rushing, Jr.

(57) ABSTRACT

A robotic apparatus includes a neck housing and a head housing. The head housing defines a sagittal axis, a frontal axis, and a vertical axis. A drive assembly is disposed at least partially within the neck housing and the head housing. The drive assembly is configured to move the head housing relative to the neck housing independently about the sagittal axis, the frontal axis, and the vertical axis such that the head housing has a range of motion that substantially corresponds to a human or animal head. The drive assembly includes a sagittal axle extending along the sagittal axis, a frontal axle rotatable about the frontal axis, and a vertical axle rotatable about the vertical axis. The vertical axle is disposed at least partially within the neck housing and offset from both the sagittal axle and the frontal axle along the vertical axis.

20 Claims, 16 Drawing Sheets

(56) References Cited

U.S. PATENT DOCUMENTS

| | | | | |
|---|---|---|---|---|
| 8,271,137 B2* | 9/2012 | Moon | ................... | B25J 13/085 |
| | | | | 700/258 |
| 8,322,250 B2* | 12/2012 | Kim | ...................... | B25J 18/00 |
| | | | | 74/490.05 |
| 8,855,821 B2* | 10/2014 | Seo | ...................... | B25J 9/0006 |
| | | | | 700/254 |
| 2002/0137426 A1* | 9/2002 | Llorens | ................. | A63H 13/00 |
| | | | | 446/268 |
| 2012/0061155 A1* | 3/2012 | Berger | ................... | B25J 5/007 |
| | | | | 180/21 |
| 2014/0039675 A1 | 2/2014 | Ead | | |
| 2015/0017876 A1* | 1/2015 | Russo | ................... | A63H 11/10 |
| | | | | 446/484 |
| 2017/0162088 A1* | 6/2017 | Kasuga | .................. | A63H 3/36 |
| 2017/0309169 A1* | 10/2017 | Ishizaki | ............... | G02B 6/4463 |

FOREIGN PATENT DOCUMENTS

| | | | |
|---|---|---|---|
| KR | 10-2010-0014038 A | 2/2010 | |
| KR | 10-2012-0131260 A | 12/2012 | |
| WO | WO-2017167281 A1 * | 10/2017 | ........... G03B 17/561 |

OTHER PUBLICATIONS

PCT International Search Report and Written Opinion in International Application PCT/US2019/030204, dated Aug. 7, 2019, 12 pages.

* cited by examiner

ROBOT NECK MECHANISM

CROSS-REFERENCE TO RELATED APPLICATIONS

This application claims priority to and the benefit of U.S. Provisional Patent Application No. 62/665,370, filed on May 1, 2018, the disclosure of which is hereby incorporated by reference in its entirety.

INTRODUCTION

Robotic remote controlled apparatuses typically use electric motors to engage one or more components of the apparatus in order to cause the apparatus to change configurations. Anatomical complex movements that allow for interaction with the apparatus and that benefit from visual approachability and familiarity can be difficult to achieve.

SUMMARY

In one aspect, the technology relates to a robotic apparatus including: a neck housing; a head housing extending from the neck housing, wherein the head housing includes: a front section and an opposite rear section, wherein a sagittal axis extends substantially horizontally from the front section towards the rear section; a right section and an opposite left section, wherein a frontal axis extends substantially horizontally from the right section towards the left section; and an upper section and an opposite lower section, wherein a vertical axis extends substantially vertically from the upper section towards the lower section; and a drive assembly disposed at least partially within the neck housing and the head housing, wherein the drive assembly is configured to move the head housing relative to the neck housing independently about the sagittal axis, the frontal axis, and the vertical axis such that the head housing has a range of motion that substantially corresponds to a human or animal head, and wherein the drive assembly includes: a sagittal axle extending along the sagittal axis; a frontal axle rotatable about the frontal axis; and a vertical axle rotatable about the vertical axis, wherein the vertical axle is disposed at least partially within the neck housing and offset from both the sagittal axle and the frontal axle along the vertical axis.

In an example, the head housing is biased about the sagittal axis, the frontal axis, and the vertical axis so as to automatically return to a centered position with respect to the neck housing. In another example, the head housing is moveable from a first position defined by the sagittal axis, the frontal axis, and the vertical axis towards a different second position defined by the sagittal axis, the frontal axis, and the vertical axis without being required to return to the centered position. In yet another example, the drive assembly further includes a chassis coupled to the vertical axle, and the frontal axle is rotatably supported by the chassis. In still another example, the frontal axle includes at least one stop projection configured to engage with the chassis and define an angular rotation range of the frontal axle. In an example, a biasing member is coupled between the frontal axle and the chassis.

In another example, the drive assembly further includes an arm structure rotatable about the sagittal axle and configured to support the head housing. In yet another example, the frontal axle includes at least one stop projection configured to engage with the arm structure and define an angular rotation range of the arm structure. In still another example, a biasing member is coupled between the sagittal axle and the arm structure. In an example, the drive assembly further includes: a sagittal motor coupled to the sagittal axle by a sagittal transmission and configured to rotate the arm structure about the sagittal axle; a frontal motor coupled to the frontal axle by a frontal transmission and configured to rotate the frontal axle; and a vertical motor coupled to the vertical axle by a vertical transmission and configured to rotate the vertical axle. In another example, at least one of the sagittal transmission, the frontal transmission, and the vertical transmission includes a gear set.

In yet another example, the sagittal motor is supported by the arm structure, and the frontal motor is supported by the chassis. In still another example, the sagittal motor and the frontal motor are disposed within the head housing and positioned above the vertical motor. In an example, the sagittal axle is fixed to the frontal axle. In another example, the vertical axle includes at least one stop projection defining an angular rotation range of the vertical axle.

In another aspect, the technology relates to a method of moving a head housing in relation to a neck housing of a robotic apparatus relative to three separate axes, the method including: selectively rotating the head housing about a sagittal axle that defines a sagittal axis by driving rotation of an arm structure coupled to the sagittal axle, wherein the arm structure supports the head housing, and wherein the sagittal axle is disposed at least partially within the head housing; selectively rotating the head housing about a frontal axle that defines a frontal axis by driving rotation of the frontal axle, wherein the sagittal axle is coupled to the frontal axle, and wherein the frontal axle is disposed at least partially within the head housing; and selectively rotating the head housing about a vertical axle that defines a vertical axis by driving rotation of the vertical axle, wherein the vertical axle is disposed at least partially within the neck housing and supports the frontal axle, and wherein the vertical axle is offset from the sagittal axle and the frontal axle along the vertical axis.

In an example, the sagittal axle is coupled to the frontal axis such that when the frontal axle rotates, the arm structure rotates about the frontal axis, and the frontal axle is rotatably supported by a chassis coupled to the vertical axle such that when the vertical axle rotates, the arm structure and the frontal axle rotate about the vertical axis. In another example, the method further includes: engaging the arm structure with at least one stop projection extending from the frontal axle to prevent over-rotation of the arm structure; and engaging the at least one stop protection projection with a chassis to prevent over-rotation of the frontal axle. In yet another example, the method further includes: biasing the arm structure about the sagittal axle such that the arm structure automatically returns to a center position about the sagittal axis; biasing the frontal axle about the frontal axis such that the frontal axle automatically returns to a center position about the frontal axis; and biasing the vertical axle about the vertical axis such that the vertical axle automatically returns to a center position about the vertical axis.

In another aspect, the technology relates to a robotic apparatus including: a neck; a head extending from the neck; and a drive assembly disposed at least partially within the neck and the head, wherein the drive assembly includes: means for independently moving the head about a roll axis of the head; means for independently moving the head about a pitch axis of the head; and means for independently moving the head about a yaw axis of the head, wherein the means for moving the head above the yaw axis is disposed at least partially within the neck and offset from the means for moving the head about the roll axis and the means for moving the head about the pitch axis along the yaw axis.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

There are shown in the drawings examples which are presently preferred, it being understood, however, that the technology is not limited to the precise arrangements and instrumentalities shown.

DETAILED DESCRIPTION

Figure 1:
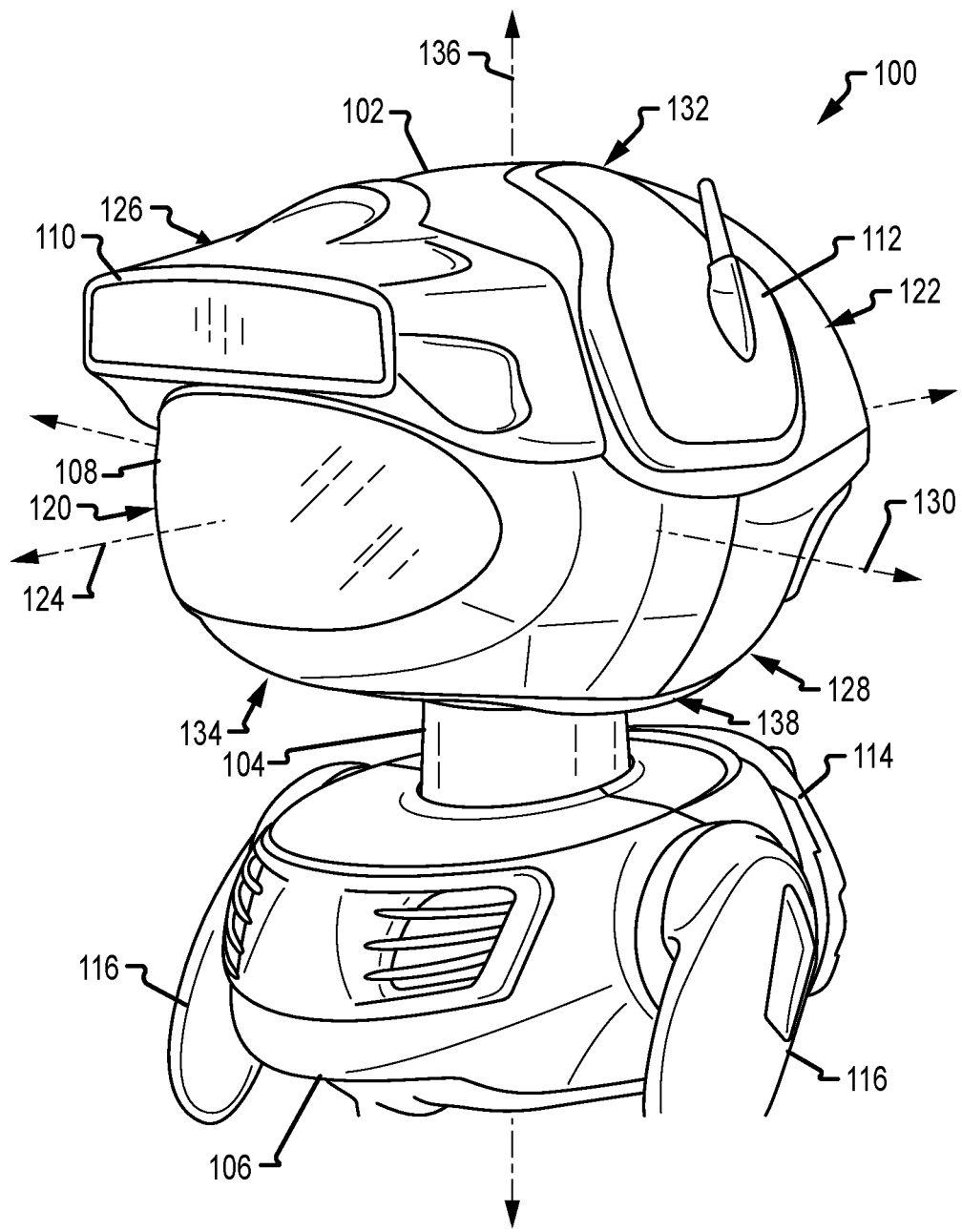
FIG. 1 is a front partial perspective view of an exemplary robotic apparatus.

A robotic neck mechanism is described herein and improves movement thereof, which can enhance user interaction and robotic performance. For example, a smooth and consistent head motion can increase a robot's ability to convey and express feelings and personality. Rather, the smooth and consistent motion may positively effect a user's perception of the robot's conveyed and expressed feelings and personality. As such, the mechanism described herein is durable and enables three-axis movement of the robot's head, which allows for a large amount of articulation that can mimic human or animal movement in a smooth and consistent motion. Movement around each axis is independent, thus making possible complex movements of the robot head. For example, the head is configured to independently move side-to-side in a yaw or vertical motion (e.g., twist horizontally), move up-and-down in a pitch or frontal motion, and tilt in a roll or sagittal motion. Thus, with the mechanism described herein, the robot may first move its chin downward toward the chest of the robot, then tilt the head to one side, without having to return the chin to an original and centered orientation. Other complex movements are also contemplated and possible. The ability to perform these complex movements allow for human-robot interaction that benefits from visual approachability and familiarity.

A head housing, a neck housing, and a torso housing enclose significant portions of the neck mechanism, namely the gear boxes, motors, axles, position sensors, and other components generally associated with the movement mechanisms (e.g., a yaw axis mechanism, a pitch axis mechanism, and a roll axis mechanism). These housings help prevent intrusion of dirt and debris into the mechanisms and help prevent physical damage to the components, should the robot strike or be struck by an object. The housings also provide structural support on which the neck drive mechanism may be mounted and secured, while promoting lifelike characteristics of the robot to enhance emotivity. The motors for each of the yaw, roll, and pitch mechanism may be battery powered and of the same or different size, performance, etc., as required or desired for a particular application. Also, the housings allow for easy access to the neck mechanism for repair or replacement of the components therein.

All three movement mechanisms are disposed within the housings, and the pitch and roll axis mechanisms are combined into a single gimbal axis within the head housing. A roll motor may be mounted generally to an exterior of an armature that forms the internal structural support to which the head housing of the robot is attached. The gear box, position sensors, and other components of the roll axis mechanism may be installed within the armature, so as to protect those elements from external forces and provide structural support thereto. A chassis is secured to the yaw axis mechanism, and disposed below the head housing. The chassis supports the pitch axis mechanism, which in turn supports the roll axis mechanism. The yaw axis mechanism rotates this chassis, thus allowing for discrete movements in pitch and/or roll directions, regardless of the yaw position of the head. The chassis also provides a structural support to a pitch axis axle. Hard stops may be located as required or desired between the various rotating elements to prevent over-rotation and ensure more realistic anatomical movement of the head housing.

The configuration of the neck mechanism also lowers the center of gravity of the head and neck assembly, thus reducing the likelihood of the robot tipping over. In examples, the center of gravity may be within the torso housing of the robot. In specific examples, the center of gravity may be as low as level with or below the arms of the robot.

FIG. 1 is a front partial perspective view of an exemplary robotic apparatus 100. The robotic apparatus 100 includes a head housing 102 supported on a neck housing 104 that extends from a torso housing 106. The head housing 102 is configured for complex movements relative to the neck housing 104 and the torso housing 106 so that the robotic apparatus 100 can mimic human and/or animal movement. This enhances user interaction with the robotic apparatus 100 and performance of the robotic apparatus 100.

The head housing 102 may support a variety of components that facilitate operation of the robotic apparatus 100. For example, an image display screen 108 may be positioned towards the front of the head housing 102 for displaying a pair of eyes (not shown) and enable the robotic apparatus 100 to convey emotion as required or desired. A visor 110 is positioned above the screen 108 and may house one or more sensors (e.g., a depth sensor) and one or more cameras (e.g., a 4k camera). A headpiece attachment 112 may be magnetically coupled to the head housing 102 so that accessory components (e.g., a projector) may be supported by the head housing 102. The head housing 102 may also support an LED flashlight, an indicator LED, and/or one or more microphones (all not shown) as required or desired. Additionally, one or more touch panels (not shown) may be positioned on the head housing 102, for example, on the top of the head housing 102, on the back of the head housing 102, and/or at a chin of the head housing 102 and below the screen 108.

Additionally or alternatively, the torso housing 106 may support a variety of components that facilitate operation of the robotic apparatus 100. For example, a removable backpack 114 may be positioned towards the back of the torso housing 106 so that one or more input/output ports (not shown) can be accessible, and a speaker (not shown) may also be disposed within the torso housing 106. The torso housing 106 also supports a pair of arms 116 that can be removed and replaced with other components as required or desired. The arms 116 may be able to rotate completely (e.g., 360°) relative to the torso housing 106. It should be appreciated that the above described components of the head housing 102 and torso housing 106 are only exemplary in nature and are not considered to be limiting.

A drive assembly 118 (shown in FIG. 2) is at least partially disposed within the head, neck, and torso housings 102, 104, 106 and is configured to drive movement of the head housing 102 in three independent directions. The head housing 102 includes a front section 120 and an opposite rear section 122 with a sagittal axis 124 extending substantially horizontally from the front section 120 towards the rear section 122. The sagittal axis 124 may also be referred to as a tilt or roll axis and is the axis that the head housing 102 rotates about for tilting motion. The head housing 102 includes a right section 126 and an opposite left section 128 with a frontal axis 130 extending substantially horizontally from the right section 126 towards the left section 128. The frontal axis 130 may also be referred to as a pitch or up-and-down axis and is the axis that the head housing 102 rotates about for up and down motion. For example, tilting the chin or the visor 110 in an up or down motion. The head housing 102 also includes an upper section 132 and an opposite lower section 134 with a vertical axis 136 extending substantially vertically from the upper section 132 towards the lower section 134. The vertical axis 136 may also be referred to as a yaw or side-to-side axis and is the axis that the head housing 102 rotates about for left and right motion. The vertical axis 136 also extends through the neck housing 104 and the torso housing 106.

One or more vent openings 138 may be defined in the head housing 102 and adjacent the neck housing 104 so that a cooling air flow can be induced within the head housing 102 and cool one or more of the electrical components housed therein. In some examples, the vent openings 138 may be sized and shaped to facilitate a passive air flow through the head housing 102. In other examples, one or more fans (not shown) may be disposed within the head housing 102 to facilitate an active air flow through the head housing 102.

In operation, the drive assembly 118 (shown in FIG. 2) is a three-axis gimbal and is configured to move the head housing 102 relative to the neck housing 104 independently about the sagittal axis 124, the frontal axis 130, and the vertical axis 136 such that the head housing 102 has range of motion that corresponds to a human (e.g., an anatomical range of motion of a human head), an animal (e.g., a range of motion similar to a dog's head), or any other movement as required or desired. As illustrated in FIG. 1, the head housing 102 is shown in a centered position and balanced substantially evenly between all three axes 124, 130, and 136. The head housing 102 is also biased (e.g., by one or more biasing elements) about the sagittal axis 124, the frontal axis 130, and/or the vertical axis 136 so as to automatically return to the center position with respect to the neck housing 104 when rotated.

The drive assembly 118 enables independent movement about each axis 124, 130, or 136, thus making complex movement of the head housing 102 possible. For example, the head housing 102 may first move its chin (e.g., the lower section 134 and the front section 120 below the screen 108) downward toward the torso housing 106 and about the frontal axis 130, and then tilt the head housing 102 about the sagittal axis 124 without having to return the head housing 102 to the centered position. As such, the head housing 102 is configured to be moveable from a first position defined by the sagittal axis 124, the frontal axis 130, and the vertical axis 136 towards a different second position define by the sagittal axis 124, the frontal axis 130, and the vertical axis 136 without being required to return to the centered position.

Figure 2:
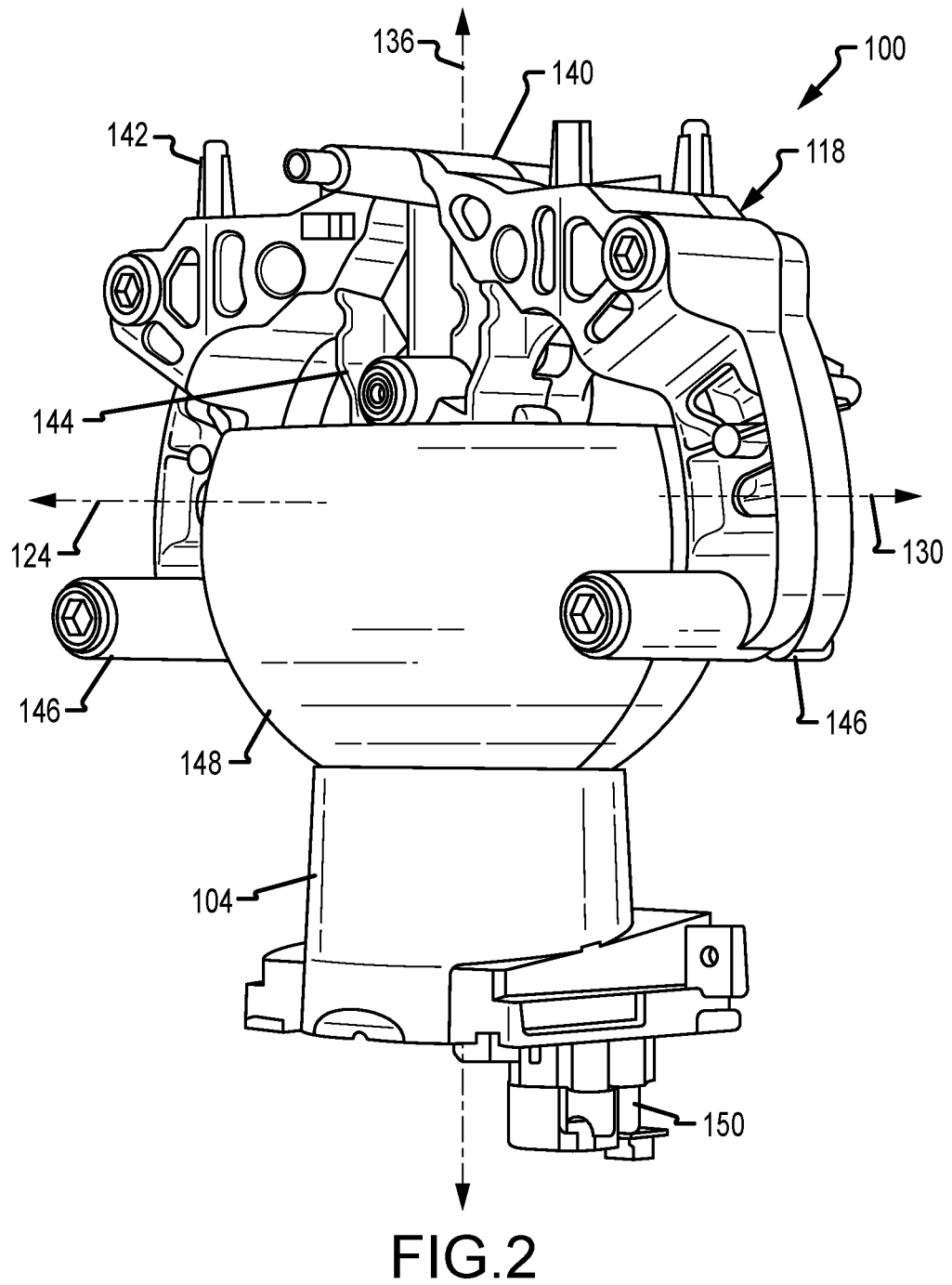
FIG. 2 is another front perspective view of the robotic apparatus with a head housing and a torso housing removed.

FIG. 2 is another front perspective view of the robotic apparatus 100 with the head housing 102 and the torso housing 106 (both shown in FIG. 1) removed. With the head and the torso housing removed, a portion of the drive assembly 118 is shown in FIG. 2. The drive assembly 118 includes an arm structure 140 that is configured to support the head housing. Additionally, one or more electronic components that enable operation of the robotic apparatus 100 may be supported by the arm structure 140. For example, a printed circuit board (not shown) may be supported by one or more posts 142 extending from the top of the arm structure 140. By placing the control components towards the top of the head housing, user access to these components becomes easier. Because multiple components of the robotic apparatus 100 may be supported by the arm structure 140, the arm structure 140 is M-shaped so that the structure extends within the entire volume of the head housing.

The arm structure 140 includes a center arm 144 and two opposing side arms 146 and at least a portion of the center arm 144 is disposed at least partially within a neck extension 148 extending from the neck housing 104. The neck extension 148 encloses a portion of the drive assembly 118 so that when the head housing moves, the drive assembly 118 and its components do not become exposed. Additionally, the space between the head housing and the drive assembly 118 forms a flow channel for cooling air flow through the head housing. The center arm 144 extends into the neck extension 148 and the two side arms 146 are positioned outside and spaced away from the neck extension 148. This configuration enables the arm structure 140 to be rotatable about all three axes 124, 130, and 136 without the neck extension 148 interfering with the movement.

The components (e.g., motors, sensors, gear boxes, etc.) of the drive assembly 118 that drive movement of the head housing can add weight to the top of the robotic apparatus, which leads to higher than desired center of gravity of the robotic apparatus. This may result in the robotic apparatus tipping over, especially when the robotic apparatus is tall and slender. As such, the drive assembly 118 is configured to lower the center of gravity of the robotic apparatus to reduce the likelihood of the robot tipping over. For example, the drive assembly 118 also includes a vertical motor 150 that is configured to drive rotation of the arm structure 140 about the vertical axis 136. The vertical motor 150 is positioned below the neck housing 104 and disposed at least partially within the torso housing. This location of the motor 150 and the configuration of the other components of the drive assembly 118 lowers the center of gravity of the drive assembly 118, thereby reducing the likelihood of the robotic apparatus 100 tipping over. In examples, the center of gravity may be within the neck housing 104. In other examples, the center of gravity may be within the torso housing and below the neck housing 104. In specific examples, the center of gravity may be as low as substantially aligning with, or below, the arms 116 (shown in FIG. 1).

Figure 3:
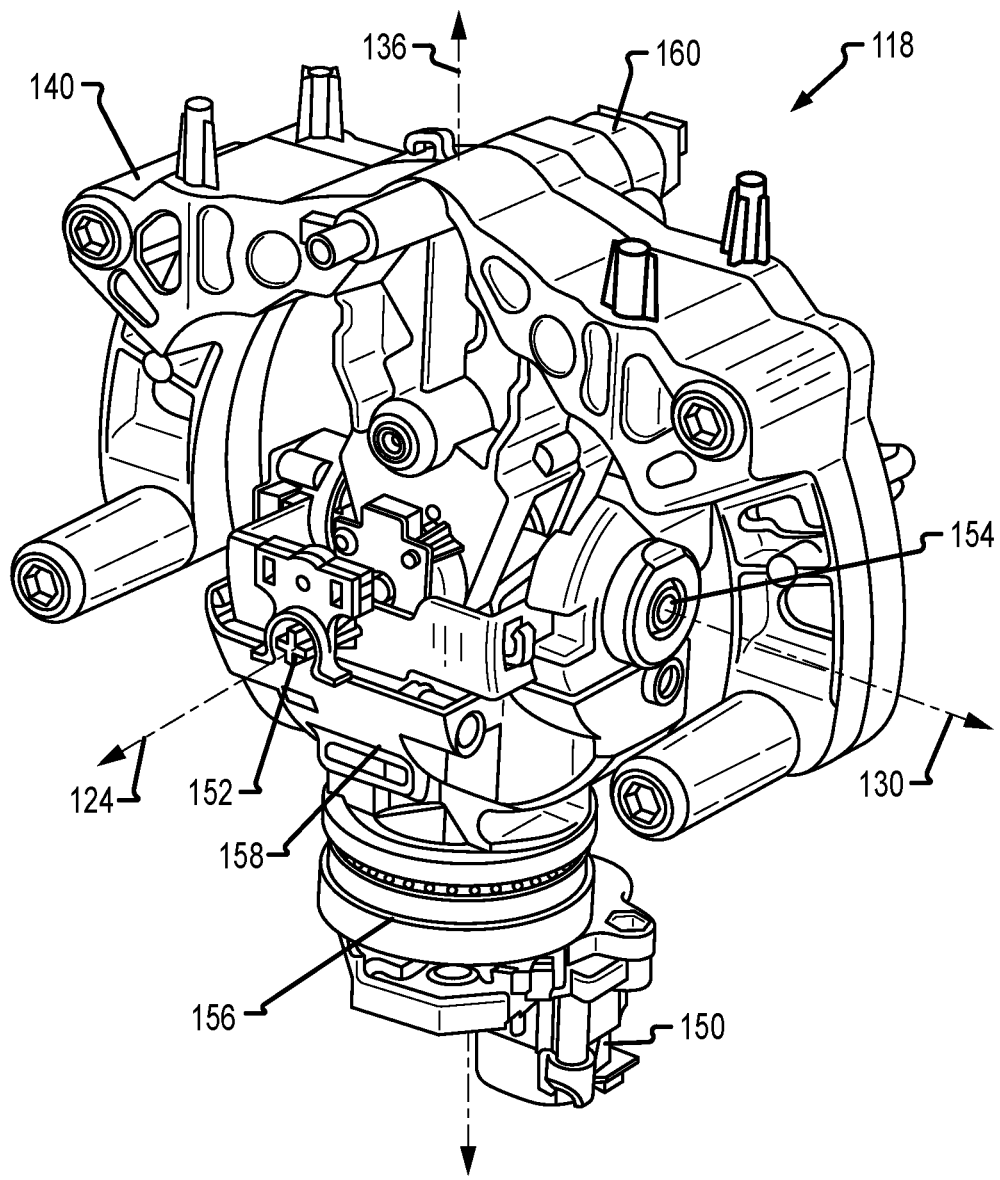
FIG. 3 is a front perspective view of a drive assembly.

FIG. 3 is a front perspective view of the drive assembly 118. The drive assembly 118 includes a sagittal axle 152 that extends along the sagittal axis 124 so that the arm structure 140 can be rotated about the sagittal axis 124 and provide tilt or roll motion to the head housing. A frontal axle 154 extends along the frontal axis 130 so that the arm structure 140 also can be rotated about the frontal axis 130 and provide up and down motion to the head housing. In the example, the sagittal axle 152 and the frontal axle 154 are substantially aligned on a plane formed by the sagittal axis 124 and the frontal axis 130. In some examples, the sagittal axle 152 and the frontal axle 154 may be a unitary component. Additionally, a vertical axle 156 extends along the vertical axis 136 so that the arm structure 140 can be rotated about the vertical axis 136 and provide left and right motion to the head housing. In the example, the vertical axle 156 is disposed at least partially within the neck housing 104 (shown in FIG. 2) and offset from both of the sagittal axle 152 and the frontal axle 154 along the vertical axis 136. That is, the vertical axle 156 is offset from the plane formed by the sagittal axis 124 and the frontal axis 130.

The drive assembly 118 also includes a chassis 158 that is coupled to the vertical axle 156 and rotates within the neck extension 148 (shown in FIG. 2). The chassis 158 also rotatably supports the frontal axle 154 for rotation about the frontal axis 130. The arm structure 140 is supported on the frontal axle 154 so as to rotate about the frontal axis 130, while also being able to rotate about the sagittal axis 124. A sagittal motor 160 is coupled to and supported by the arm structure 140 and towards the top of the structure 140. The sagittal motor 160 is configured to rotate the arm structure 140 about the sagittal axle 152. A frontal motor 162 (shown in FIG. 4) is supported by the chassis 158 and is configured to rotate the frontal axle 154, and thus, the arm structure 140 about the frontal axis 130.

Figure 4:
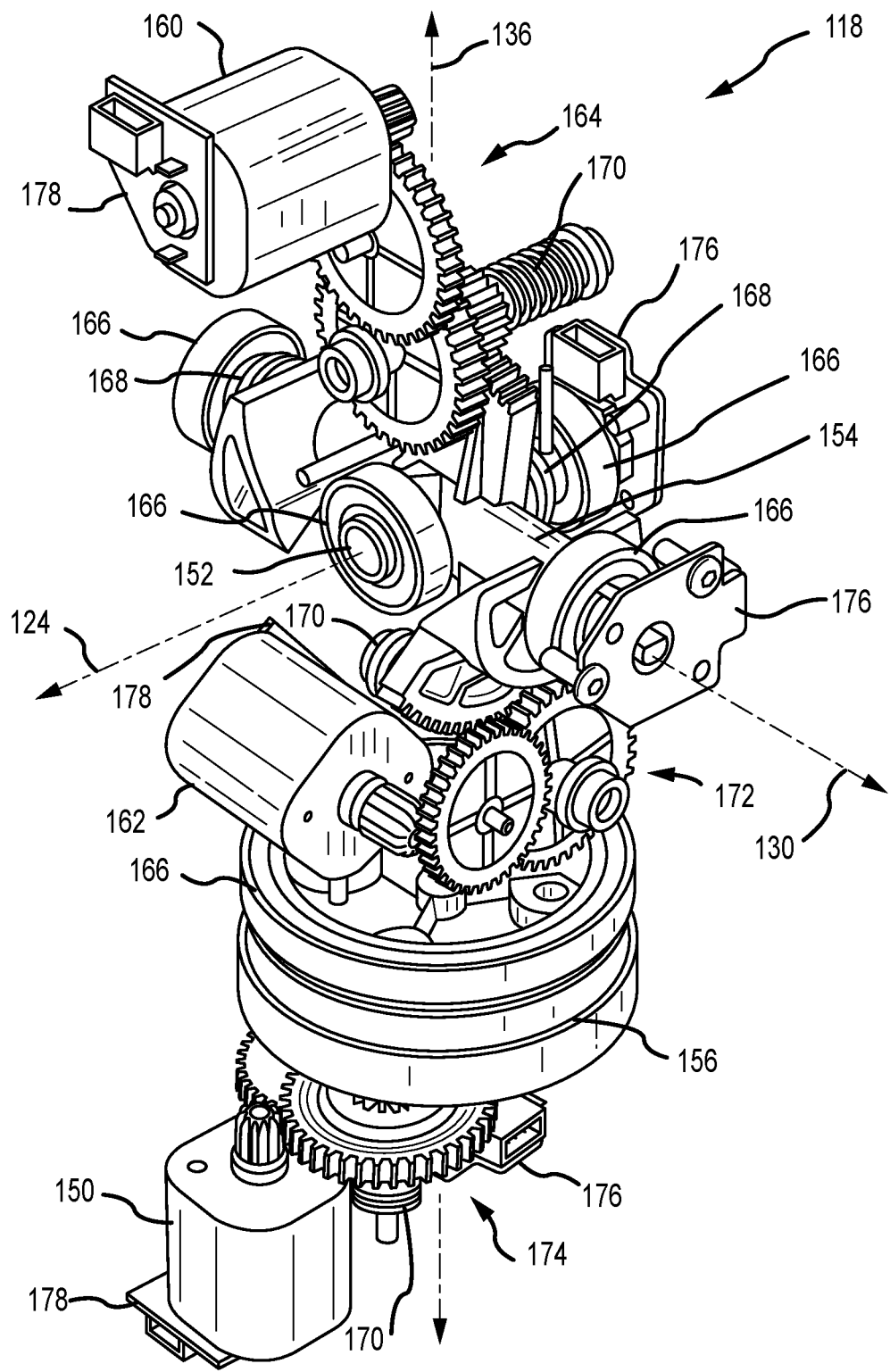
FIG. 4 is a rear perspective view of the drive assembly with an arm structure and a chassis removed.

FIG. 4 is a rear perspective view of the drive assembly 118 with the arm structure 140 and the chassis 158 (both shown in FIG. 3) removed. As described above, the sagittal motor 160 is supported by the arm structure and is coupled to the sagittal axle 152 by a sagittal transmission 164. The sagittal transmission 164 includes a gear set that, upon rotation by the motor 160, is configured to rotate the arm structure about the sagittal axle 152 and the sagittal axis 124. In the example, the sagittal axle 152 is fixed to the frontal axle 154 and the arm structure moves relative to the axle 152 for rotation about the sagittal axis 124. The arm structure is rotatably supported on the sagittal axle 152 by one or more bearings 166. At least a portion of the sagittal transmission 164 is disposed within the arm structure to provide protection thereof.

Additionally, one or more biasing members 168 (e.g., a torsion spring) are coupled to the sagittal axle 152 and engaged with the arm structure. The biasing member 168 is configured to automatically return the arm structure to a centered position (e.g., balanced about the axis 124). For example, once the rotational drive from the motor 160 is released, the arm structure can automatically return to the centered position (shown in FIG. 1). In another example, when the head housing 102 (shown in FIG. 1) is manually rotated about the sagittal axis 124, the arm structure can automatically return to the centered position (shown in FIG. 1). The biasing member 168 also is an anti-backlash spring that removes play from the rotational movement around the sagittal axis 124 and smooths the operation of the transmission 164, while inducing tension forces within the sagittal transmission 164 to ensure that the gears are engaged. Additionally, the sagittal transmission 164 includes a clutch assembly 170 that is coupled to one of the gears of the gear set. The clutch assembly 170 is described further below in reference to FIG. 5.

The frontal motor 162 is supported by the chassis and is coupled to the frontal axle 154 by a frontal transmission 172. The frontal transmission 172 includes a gear set that, upon rotation by the motor 162, is configured to rotate the frontal axle 154, and thereby the arm structure, about the frontal axis 130. The frontal axle 154 is rotatably supported on the chassis by one or more bearings 166. One or more biasing members 168 are coupled to the frontal axle 154 and engaged with the chassis. The biasing member 168 returns the head housing to a centered position about the frontal axis 130 and as shown in FIG. 1. Additionally, the frontal transmission 172 includes the clutch assembly 170 that is coupled to one of the gears of the gear set.

The sagittal motor 160 and the frontal motor 162 are disposed within the head housing and positioned above the vertical motor 150 along the vertical axis 136. The vertical motor 150 is supported within the torso housing 106 (shown in FIG. 1) and is coupled to the vertical axle 156 by a vertical transmission 174. The vertical transmission 174 includes a gear set that, upon rotation by the motor 150, is configured to rotate the vertical axle 156, and thereby the chassis and the arm structure, about the vertical axis 136. The vertical axle 156 is rotatably supported within the neck housing 104 (shown in FIG. 1) by one or more bearings 166. One or more biasing members 168 (shown in FIG. 10A) are coupled to the vertical axle 156 and engaged with the neck housing. The biasing member 168 returns the head housing to a centered position about the vertical axis 136 and as shown in FIG. 1. Additionally, the vertical transmission 174 includes the clutch assembly 170 that is coupled to one of the gears of the gear set.

Each motor 150, 160, and 162 may be an electric motor or the like and powered by a battery (not shown) disposed within the robotic apparatus 100 (shown in FIG. 1). The motors 150, 160, and/or 162 may be the same, or different, size, torque, etc., as required or desired for performance for a particular application. For example, the vertical motor 150 may generate an increased amount of torque because it is driving rotation for more weight than compared to the other motors. The bearings 166 serve as rotational load bearing surfaces and may be bushings, ball, roller, magnetic, or fluid bearings, as required or desired.

Each axle 152, 154, and 156 is associated with a position sensor 176 that is used to determine relative location of each axle, or component coupled to the axle, relative to a datum. The position sensor 176 may be a variable resistance potentiometer, rotary encoder, or other type of sensor, as required or desired. Each motor 150, 160, and 162 is communicatively coupled to a motor controller 178. The motor controllers 178 are in communication with the position sensor 176 and may also be in communication with a closed loop controller (not shown) of the robotic apparatus. In operation, a signal, for example, a digital signal (e.g., pulse width modulation), is sent to a particular motor controller 178 that causes the motor 150, 160, and/or 162 to rotate, thus articulating the associated axle 152, 154, and/or 156. In some examples, the input signal to the motor 150, 160, and 162 may be compared to an output signal of the position sensors 176 to ensure desired performance and/or identify potential movement issues with the drive assembly 118.

Figure 5:
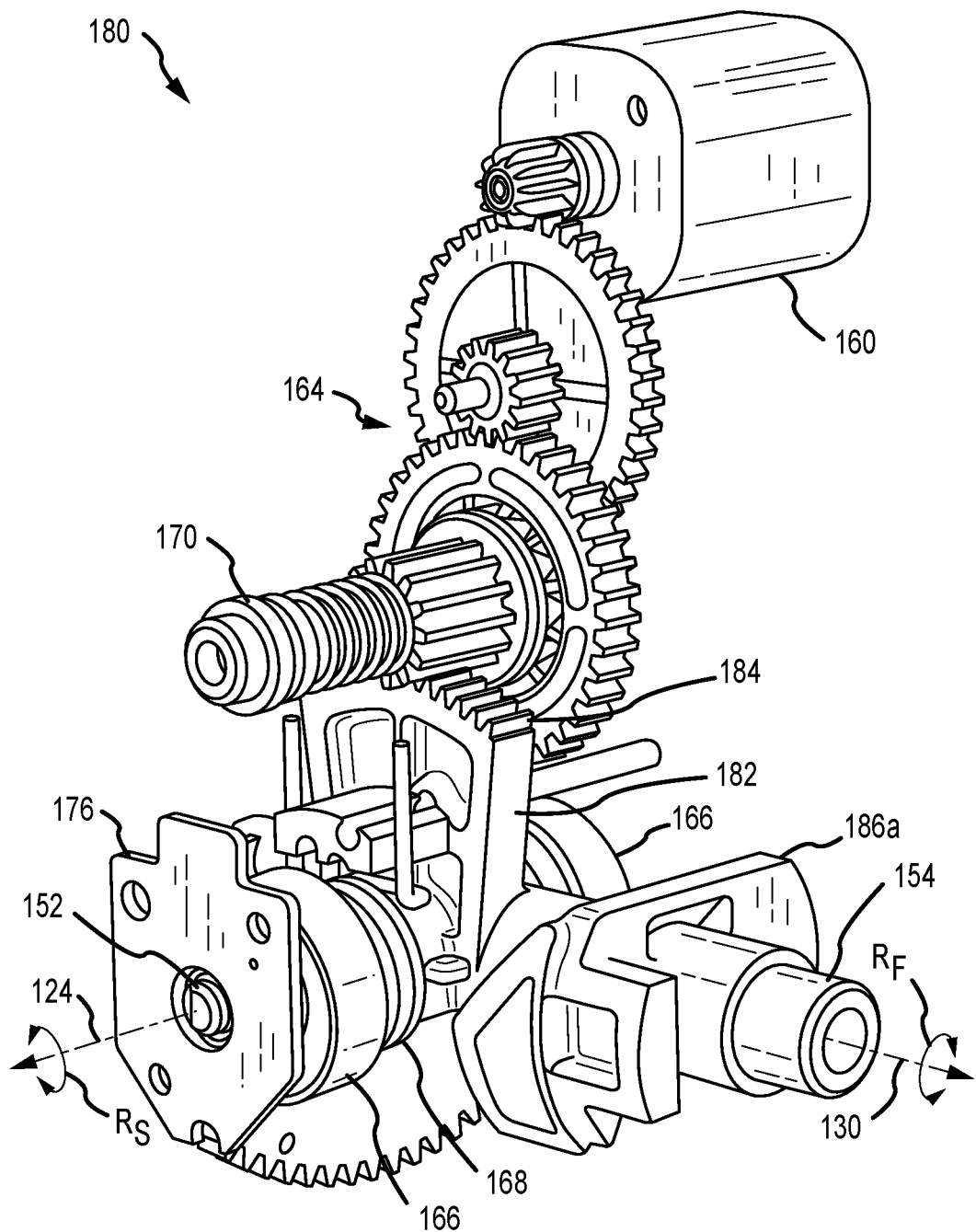
FIG. 5 is a perspective view of a sagittal drive assembly.

FIG. 5 is a perspective view of a sagittal drive assembly 180 with the arm structure 140 (shown in FIG. 3) not shown for clarity. Certain components are described above, and thus, are not necessarily described further. The sagittal drive assembly 180 forms a portion of the drive assembly 118 (shown in FIG. 3) and enables rotation $R_S$ of the arm assembly about the sagittal axis 124. This rotation $R_S$ allows the head housing 102 (shown in FIG. 1) to tilt or roll (e.g., as that terminology is used in the context of an aircraft movement) to one side or another and increases user acceptance of robotic movement that mimics human or animal movement.

The sagittal drive assembly 180 includes the sagittal motor 160 that is supported by the arm assembly. The sagittal transmission 164 and the clutch assembly 170 are also supported by the arm assembly. The sagittal axle 152 extends from the frontal axle 154 and is fixed thereto. By combining the sagittal axle 152 and the frontal axle 154 into a single unitary gimbal axis, the weight of the sagittal drive assembly 180 can be reduced, thereby lowering the center of gravity of the drive assembly. In other examples, however, the sagittal axle 152 and the frontal axle 154 may be discrete components. As such, it is the arm assembly that is supported by the bearings 166 and rotates $R_S$ relative to the sagittal axis 124. Additionally, the sagittal drive assembly 180, including the sagittal axis 124, as a whole can rotate RF about the frontal axis 130. A first flange 182 extends from the frontal axle 154 along the frontal axis 130 and proximate the sagittal axle 152. The end of the first flange 182 forms a first rack 184 that the gear set of the transmission 164 drives against to enable rotation of the sagittal drive assembly 180. The frontal axle 154 also includes a pair of first stop projections 186 on either side of the first flange 182.

The clutch assembly 170 is incorporated into one of the gears in the gear set. In normal operational loads, the smaller clutch gear in the clutch assembly 170 and the larger gear in the gear set rotate together as one compound gear. Under high impulsive loads, however, the clutch assembly 170 is configured to slip relative to the gear set and the smaller clutch gear is allowed to rotate with respect to the larger gear in the gear set. Accordingly, if the robotic apparatus falls down for example, the clutch assembly 170 protects the gear teeth of the gear set. Additionally, the clutch assembly 170 reduces the current loads on the motor 160, thereby increasing the life-cycle of the motor 160. In this case, when rotation $R_S$ about the sagittal axis 124 is immobilized, the motor 160 is still allowed to turn because of the slip within the clutch assembly 170, thereby protecting the motor 160.

Figure 6A:
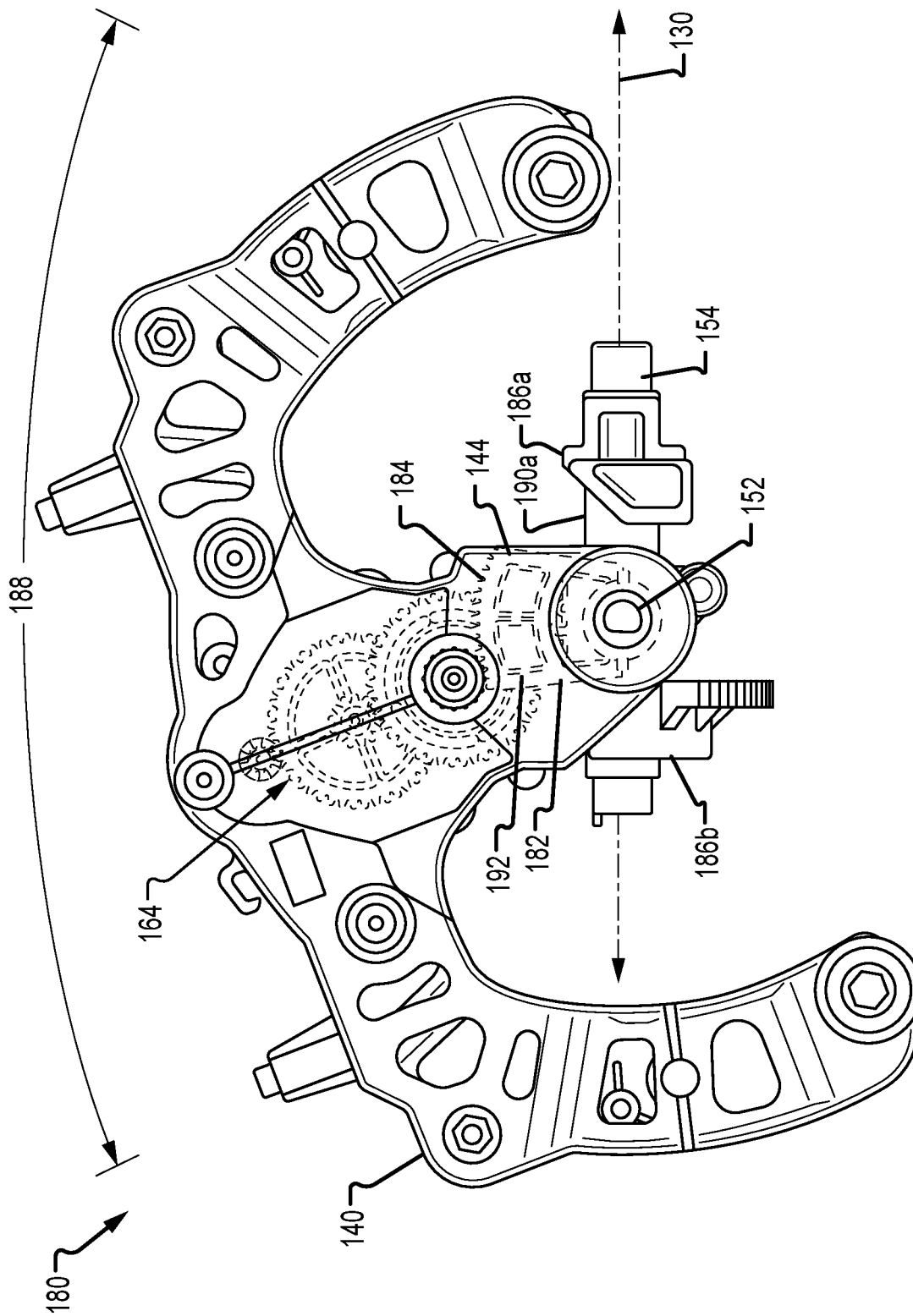
FIGS. 6A and 6B are side views of the sagittal drive assembly in a left-roll position and a right-roll position, respectively.
Figure 6B:
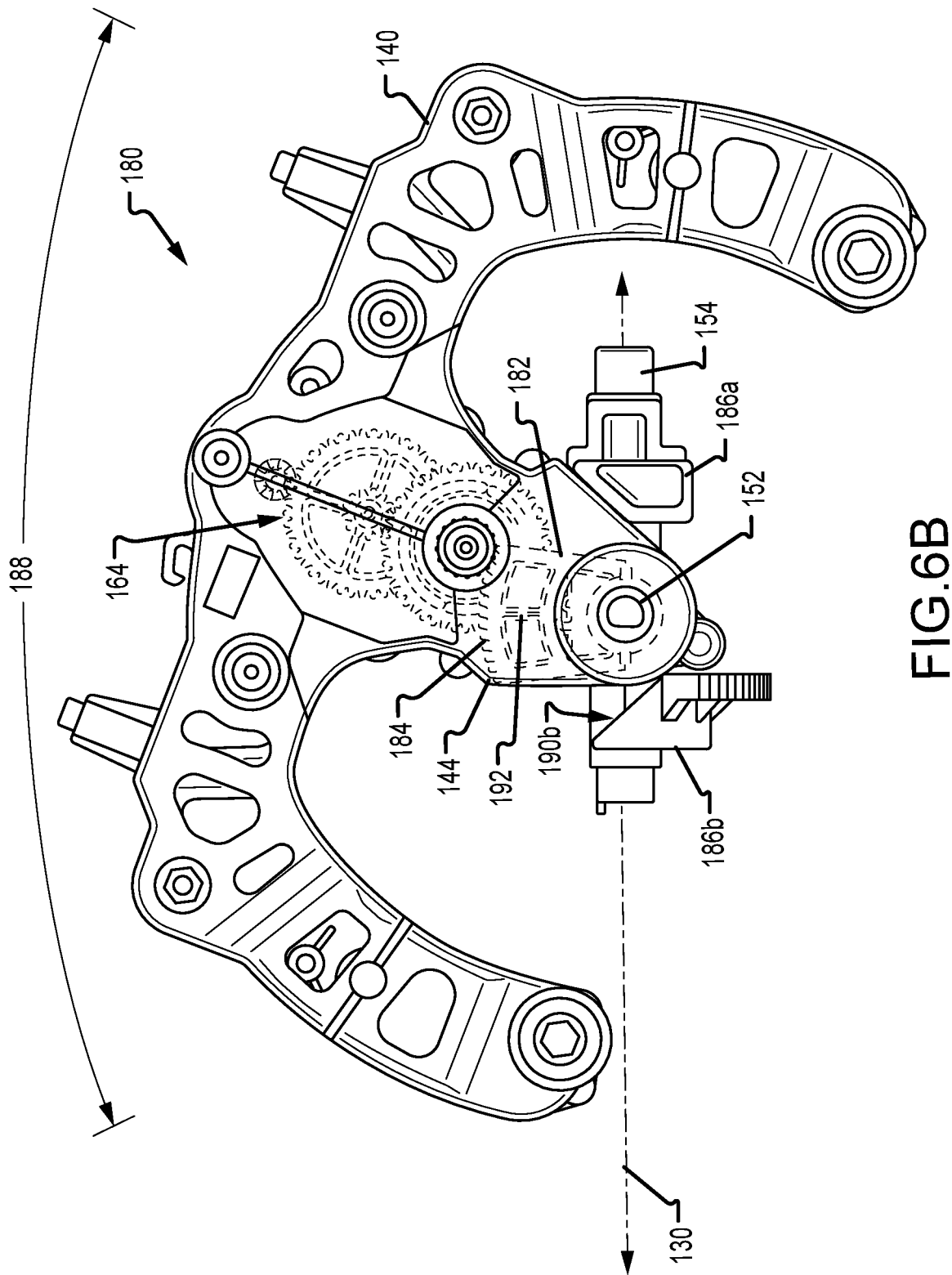

FIGS. 6A and 6B are side views of the sagittal drive assembly 180 in a left-roll position and a right-roll position, respectively. Referring concurrently to FIGS. 6A and 6B, the arm structure 140 is illustrated as translucent for clarity. The sagittal transmission 164 is housed at least partially within and supported by the arm structure 140. The transmission 164 is also engaged with the first rack 184 of the first flange 182 extending from the frontal axle 154. The center arm 144 of the arm structure 140 is rotatably mounted to the sagittal axle 152 that extends from the frontal axle 154.

The first stop projections 186 extending from the frontal axle 154 are configured to engage with the arm structure 140 and define an angular rotation range 188 of the sagittal drive assembly 180 about the sagittal axle 152 (the sagittal axis being in an out of the page of FIGS. 6A and 6B). In examples, the rotational range 188 may be between about 30° and 50°. In one example, the rotational range 188 is between about 38° and 40° so as to provide more realistic anatomical movement of the robotic apparatus 100 (shown in FIG. 1). The angular rotation range 188 extends along the rotation direction $R_S$ (shown in FIG. 5) around the sagittal axle 152. More specifically, the first stop projections 186 have a first oblique surface 190 that engage with the sides of the center arm 144 and form a hard stop preventing rotation of the arm structure 140 beyond the rotation range 188 in left and right roll directions. The arm structure 140 also includes a projection 192 that extends from the center arm 144 and is configured to engage with the biasing member 168 (shown in FIG. 5).

In operation, the sagittal drive assembly 180 can be independently driven in relation to the other components of the drive assembly 118 (shown in FIG. 4). As such, no matter what position the head housing 102 (shown in FIG. 1) is in relative to the other two axes, the head housing can tilt or roll relative to the neck housing 104 (shown in FIG. 1). This tilting or rolling motion moves the head housing and facilitates robotic movement that mimics human or animal movement in the robotic apparatus 100 (shown in FIG. 1).

Figure 7:
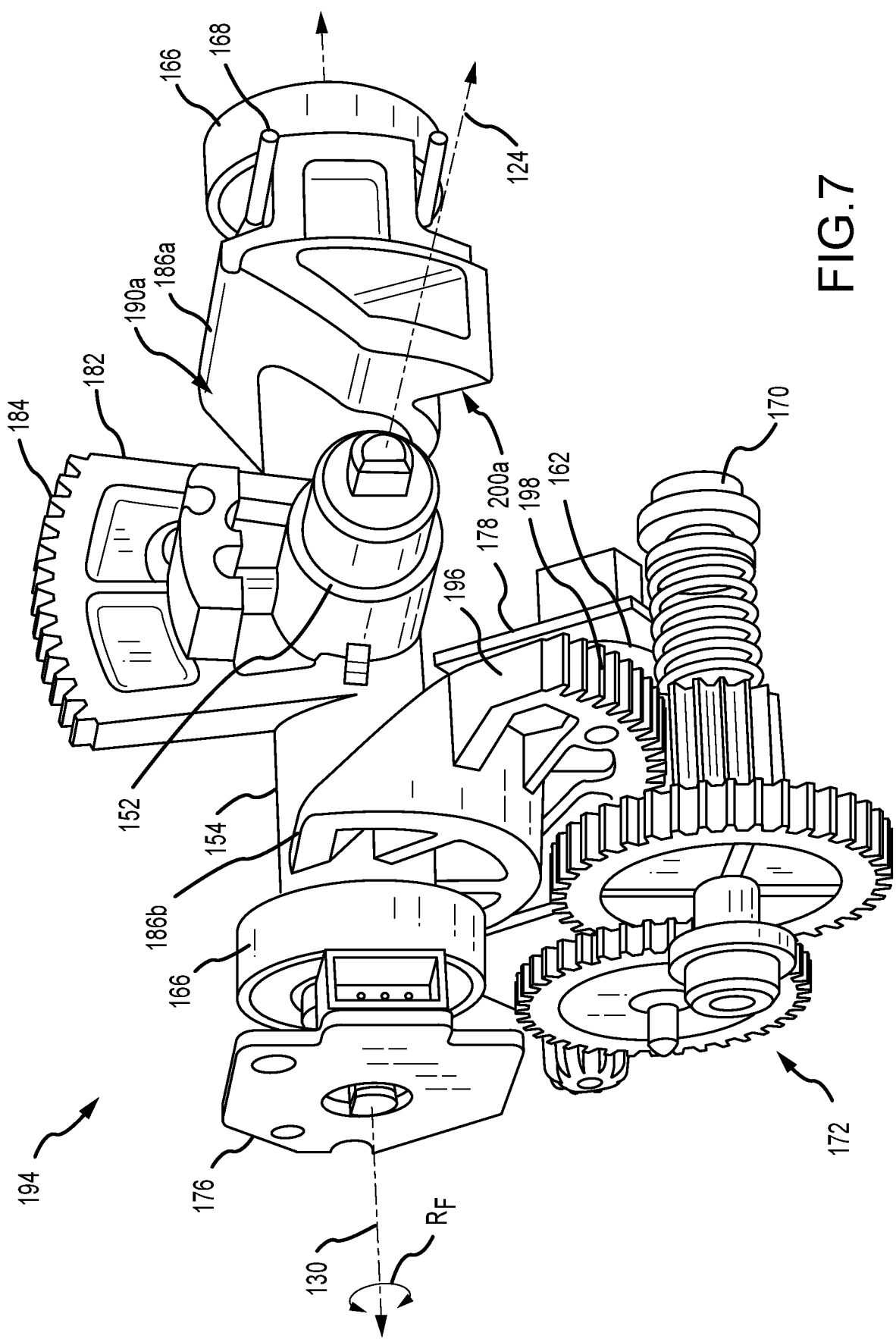
FIG. 7 is a perspective view of a frontal drive assembly.

FIG. 7 is a perspective view of a frontal drive assembly 194 with the chassis 158 (shown in FIG. 3) not shown for clarity. Certain components are described above, and thus, are not necessarily described further. The frontal drive assembly 194 forms a portion of the drive assembly 118 (shown in FIG. 3) and enables rotation RF of the frontal axle 154 about the frontal axis 130. This rotation RF allows the head housing 102 (shown in FIG. 1) to pitch up and down.

The frontal axle 154 is supported on the chassis by the bearings 166. The frontal axle 154 includes the sagittal axle 152 and the first flange 182 extending therefrom as described above. The frontal drive assembly 194 includes the frontal motor 162 that is supported by the chassis. The frontal transmission 172 and the clutch assembly 170 are also supported by the chassis and housed at least partially therein. As such, it is the frontal axle 154 that rotates RF relative to the frontal axis 130, while the remaining components of the frontal drive assembly 194 remain fixed relative to the chassis. The frontal axle 154 includes a second flange 196 extending radially from the frontal axis 130. The end of the second flange 196 forms a second rack 198 that the gear set of the transmission 172 drives against to enable rotation of the frontal drive assembly 194. One or more of the first stop projections 186 of the frontal axle 154 includes a pair of second oblique surfaces 200 that extend radially from the frontal axle 154. In the example, one first stop projection 186*a* forms the second oblique surfaces 200 while the other first stop projection 186*b* has the second flange 196 extending therefrom. In other examples, the second flange 196 may be separate from the first stop projections 186 and/or the oblique surface 200 may be separate from the first stop projections 186, as required or desired.

By combining the sagittal axle 152 and the frontal axle 154 into one unitary component, the configuration provides a relatively high gear ratio (e.g., facilitate a large range of motion) in a compact space within the head housing. Additionally, this configuration enables the hard stops (e.g., 190 and 200) and the final gears (e.g., 184 and 198) to be included in the unitary component to reduce the number of parts and increase free space within the head housing. The position sensors 176, the biasing springs 168, etc. are also attached so that these components increase the free space within the head housing.

Figure 8A:
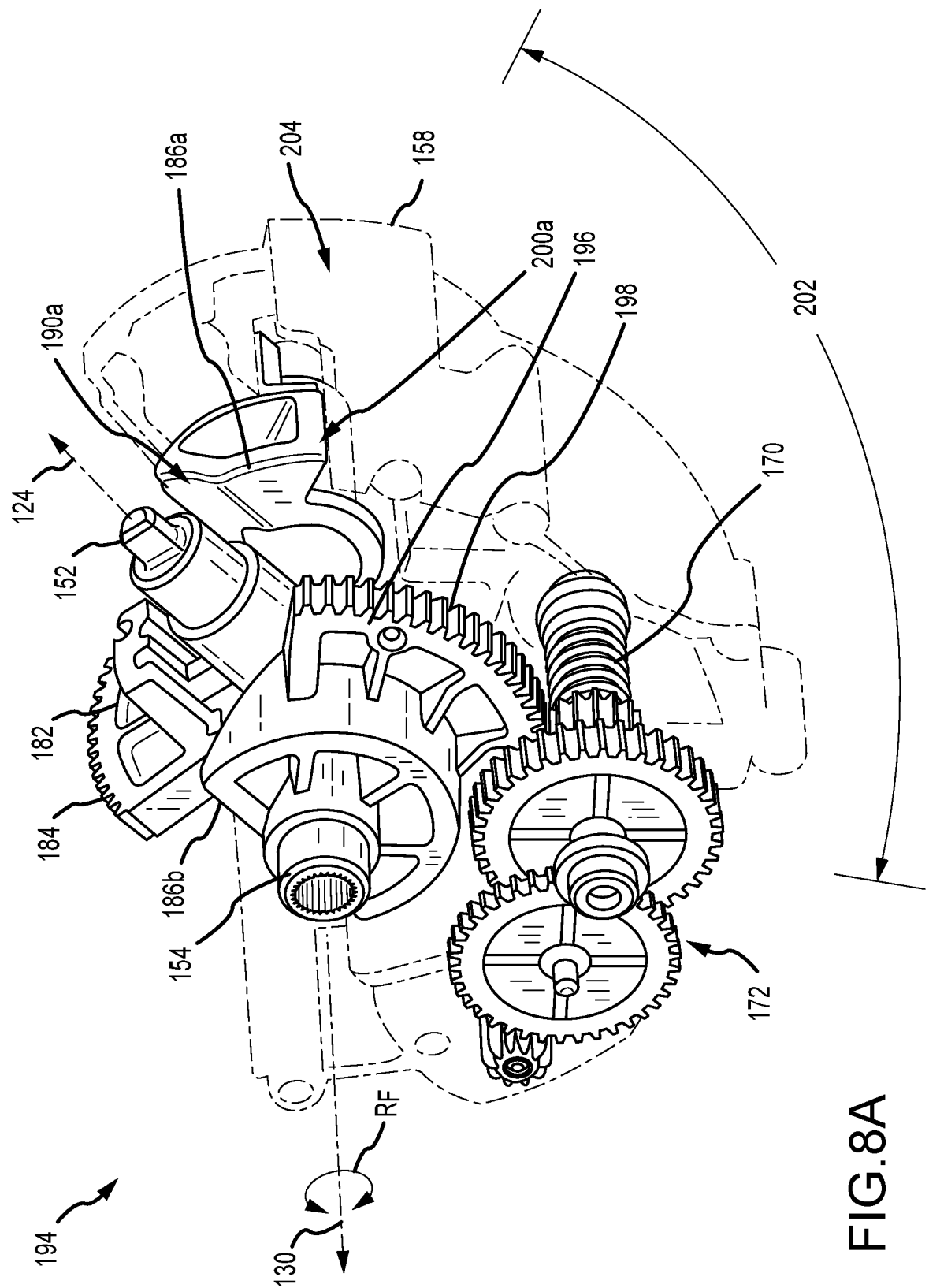
FIGS. 8A and 8B are partial perspective views of the frontal drive assembly in a raised-pitch position and a lowered-pitch position, respectively.
Figure 8B:
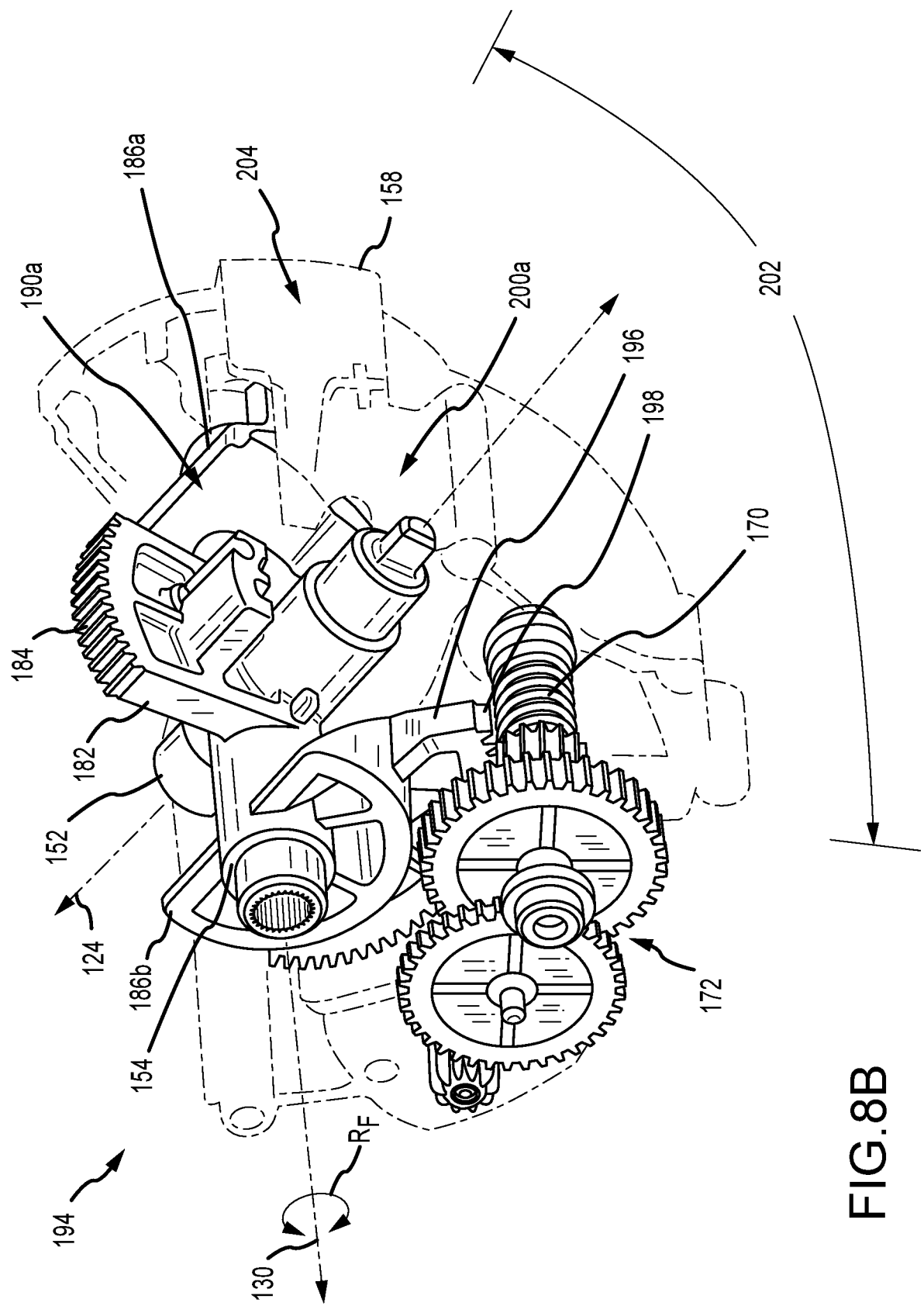

FIGS. 8A and 8B are partial perspective views of the frontal drive assembly 194 in a raised-pitch position and a lowered-pitch position, respectively. Referring concurrently to FIGS. 8A and 8B, the chassis 158 is only partially illustrated and shown as translucent for clarity. Additionally, certain components are described above, and thus, are not necessarily described further. The frontal drive assembly 194 is housed at least partially within and supported by the chassis 158. The transmission 172 is also engaged with the second rack 198 of the second flange 196 extending from the frontal axle 154.

The first stop projection 186 extending from the frontal axle 154 and having the pair of second oblique surfaces 200 is configured to engage with the chassis 158 and defines an angular rotation range 202 of the frontal drive assembly 194 about the frontal axis 130. In examples, the rotational range 202 may be between about 45° and 135°. In one example, the rotational range 202 may be less than, or equal to, about 90° so as to provide more realistic anatomical movement of the robotic apparatus 100 (shown in FIG. 1). The angular rotational range 202 extends along the rotation direction RF around the frontal axis 130. More specifically, as illustrated in FIG. 8A, the second oblique surface 200 (shown as located behind the second flange 196 in FIG. 8A) is engaged with a stop surface disposed on an inner surface of the chassis 158 to form a hard stop preventing rotation RF of the frontal axle 154 beyond the rotation range 202 in the upward pitch direction. Similarly, as illustrated in FIG. 8B, the second oblique surface 200a (visible in FIG. 8B) is engaged with another stop surface disposed on an inner surface of the chassis 158 forms the other hard stop preventing rotation RF of the frontal axle 154 beyond the rotation range 202 in the downward pitch direction. The chassis 158 also includes a recess 204 that is configured to engage with the biasing member 168 (shown in FIG. 7).

In operation, the frontal drive assembly 194 can be independently driven in relation to the other components of the drive assembly 118 (shown in FIG. 4). As such, no matter what position the head housing 102 (shown in FIG. 1) is in relative to the other two axes, the head housing can pitch and move up or down relative to the neck housing 104 (shown in FIG. 1). This pitching motion moves the head housing and facilitates robotic movement that mimics human or animal movement in the robotic apparatus 100 (shown in FIG. 1). Furthermore, because the sagittal axle 152 is fixed to the frontal axle 154, the components of the sagittal drive assembly 180 (shown in FIG. 5) also rotate RF around the frontal axis 130.

Figure 9:
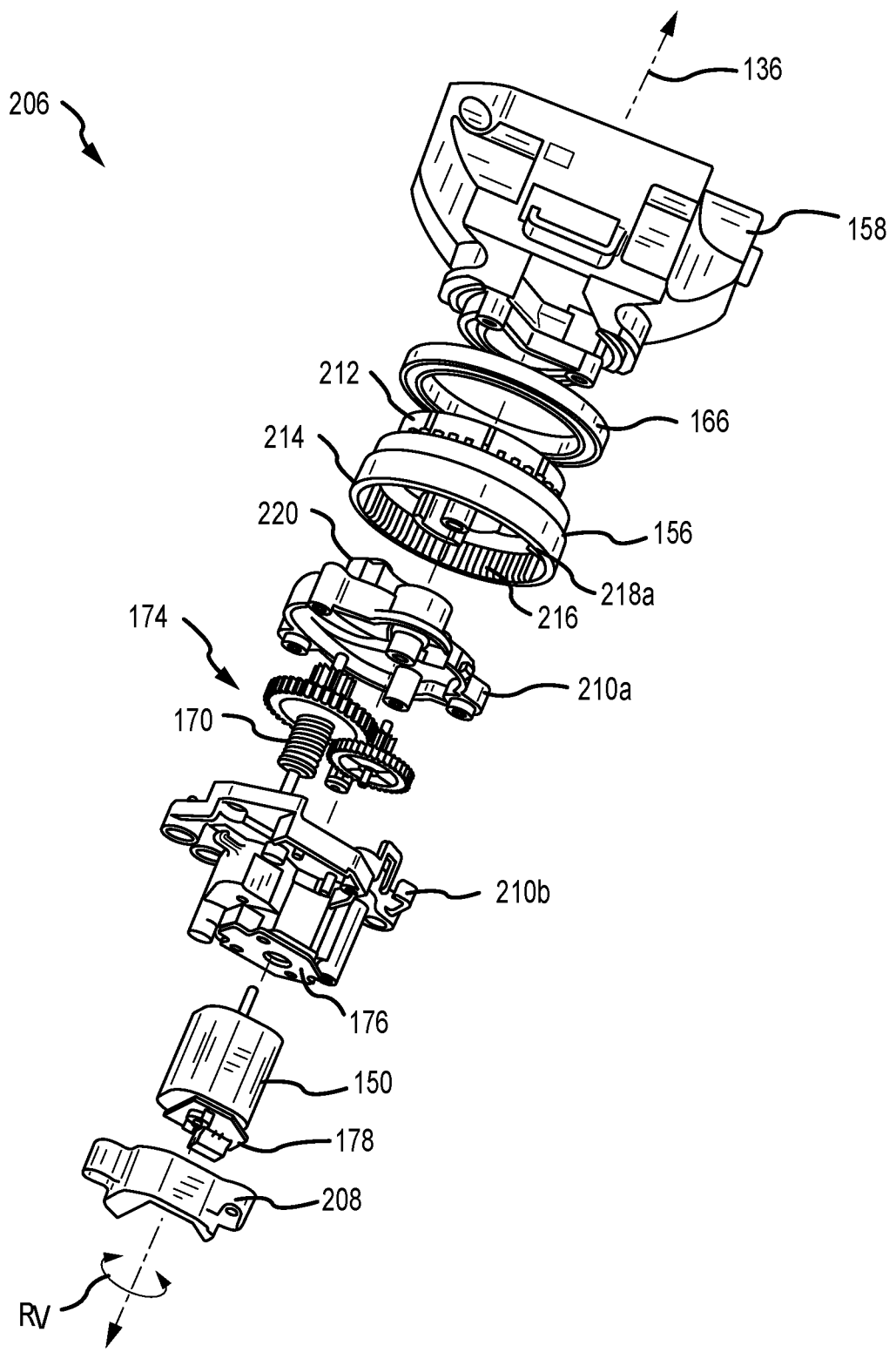
FIG. 9 is an exploded perspective view of a vertical drive assembly.

FIG. 9 is an exploded perspective view of a vertical drive assembly 206 with the neck housing 104 (shown in FIG. 1) not shown for clarity. Certain components are described above, and thus, are not necessarily described further. The vertical drive assembly 206 forms a portion of the drive assembly 118 (shown in FIG. 3) and enables rotation $R_V$ of the vertical axle 156 about the vertical axis 136. The rotation $R_V$ allows the head housing 102 (shown in FIG. 1) to move side-to-side (e.g., look left and right).

The vertical axle 156 is supported within the neck housing by the bearing 166 and supports the chassis 158 so that the sagittal drive assembly 180 (shown in FIG. 5) and the frontal drive assembly 194 (shown in FIG. 7) supported thereon can rotate $R_V$ around the vertical axis 136. The vertical drive assembly 206 includes the vertical motor 150 that is disposed at least partially within the torso housing 106 (shown in FIG. 1) and supported therein by a bracket 208. The vertical transmission 174 and the clutch assembly 170 are supported by a transmission housing 210 that is coupled to at least one of the torso housing and/or the neck housing, and as such, the housing 210 is fixed from rotation about the vertical axis 136. As such, it is the vertical axle 156 that rotates $R_V$ relative to the vertical axis 136 and within the neck housing, while the remaining components of the vertical drive assembly 206 remain fixed to the torso and/or neck housings.

The vertical axle 156 is substantially cylindrically-shaped internal ring gear with a first end 212 configured to couple to the chassis 158 and the bearing 166. A second end 214 of the vertical axle 156 has an inner surface that includes a third rack 216 that the gear set of the transmission 174 drives against to enable rotation of the vertical drive assembly 206. A pair of second stop projections 218 also extend from the inner surface of the vertical axle 156 and are positioned at each end of the third rack 216. The transmission housing 210 includes one or more posts 220 that extend at least partially within the second end 214 of the vertical axle 156 and configured to engage with the second stop projections 218 so as to define the rotation range of the vertical drive assembly 206 as described further below. The vertical axle 156 being an internal ring gear allows for connection/communication wires (not shown) to extend through the neck housing without being twisted by the rotation of the vertical drive assembly 206.

Figure 10A:
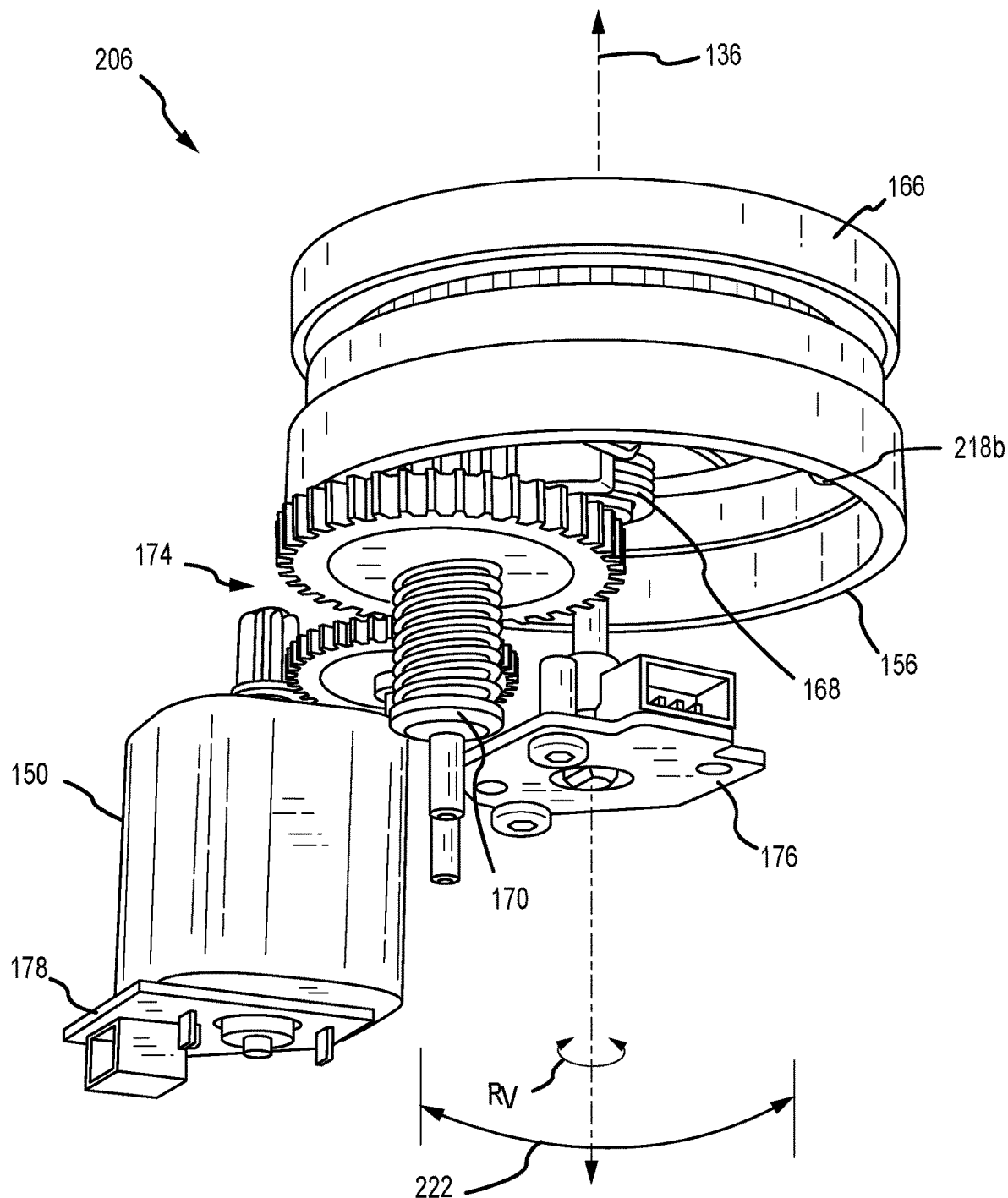
FIGS. 10A and 10B are partial perspective views of the vertical drive assembly in a left-yaw position and right-yaw position, respectively.
Figure 10B:
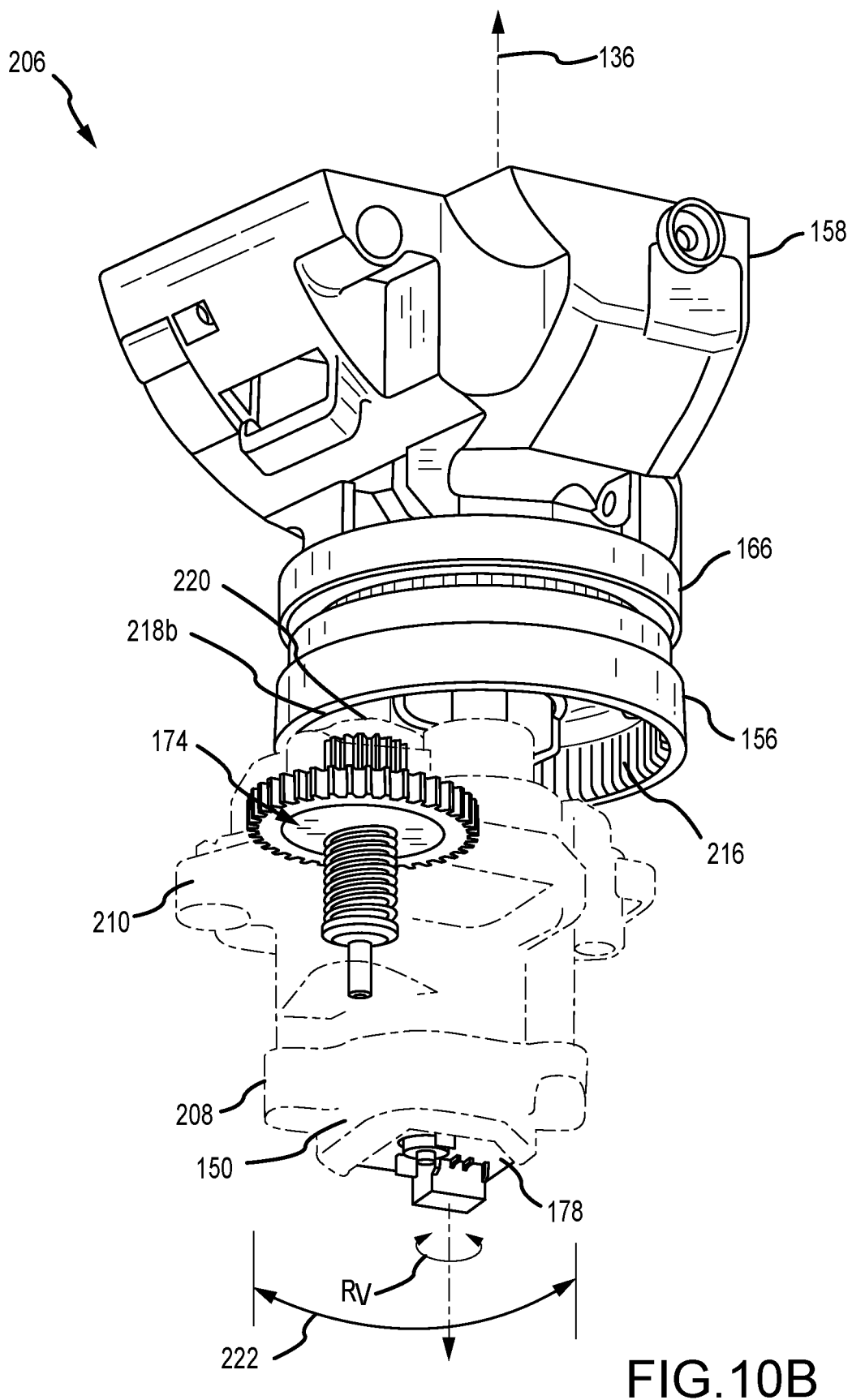

FIGS. 10A and 10B are partial perspective views of the vertical drive assembly 206 in a left-yaw position and right-yaw position, respectively. Referring concurrently to FIGS. 10A and 10B, certain components are described above, and thus, are not necessarily described further. Additionally, in FIG. 10A the transmission housing 210 is not shown for clarity, while in FIG. 10B the transmission housing 210 is shown as translucent for clarity. The vertical drive assembly 206 is housed at least partially within and supported by the neck housing 104 and the torso housing 106 (both shown in FIG. 1). The transmission 174 is also engaged with the third rack 216 of the vertical axle 156.

The second stop projections 218 extending from the vertical axle 156 are configured to engage with the post 220 extending from the transmission housing 210 and defines an angular rotation range 222 of the vertical drive assembly 206 about the vertical axle 156. In examples, the rotational range 222 may be between about 30° and 300°. In one example, the rotational range 222 may be about 180° so as to provide more realistic anatomical movement of the robotic apparatus 100 (shown in FIG. 1). The angular rotational range 222 extends along the rotation direction $R_V$ around the vertical axis 136. More specifically, as illustrated in FIG. 10A, the second stop projection 218 (shown as located behind the transmission 174 in FIG. 10A) is engaged with the post 220 (not shown in FIG. 10A) of the transmission housing 210 to form a hard stop preventing rotation $R_V$ of the vertical axle 156 beyond the rotation range 222 in a left-yaw direction. Similarly, as illustrated in FIG. 8B, the second stop projection 218b (visible in FIG. 8B) is engaged with the post 220 of the transmission housing 210 to form a hard stop preventing rotation $R_V$ of the vertical axle 156 beyond the rotation range 222 in a right-yaw direction. The post 220 also is configured to engage the biasing member 168.

In operation, the vertical drive assembly 206 can be independently driven in relation to the other components of the drive assembly 118 (shown in FIG. 4). As such, no matter what position the head housing 102 (shown in FIG. 1) is in relative to the other two axes, the head housing can move side-to-side (e.g., left to right) relative to the neck housing 104 (shown in FIG. 1). This side motion moves the head housing and facilitates robotic movement that mimics human or animal movement in the robotic apparatus 100 (shown in FIG. 1). Furthermore, because the chassis 158 supports both the sagittal drive assembly 180 (shown in FIG. 5) and the frontal drive assembly 194 (shown in FIG. 7), these components also rotate $R_V$ around the vertical axis 136.

Figure 11:
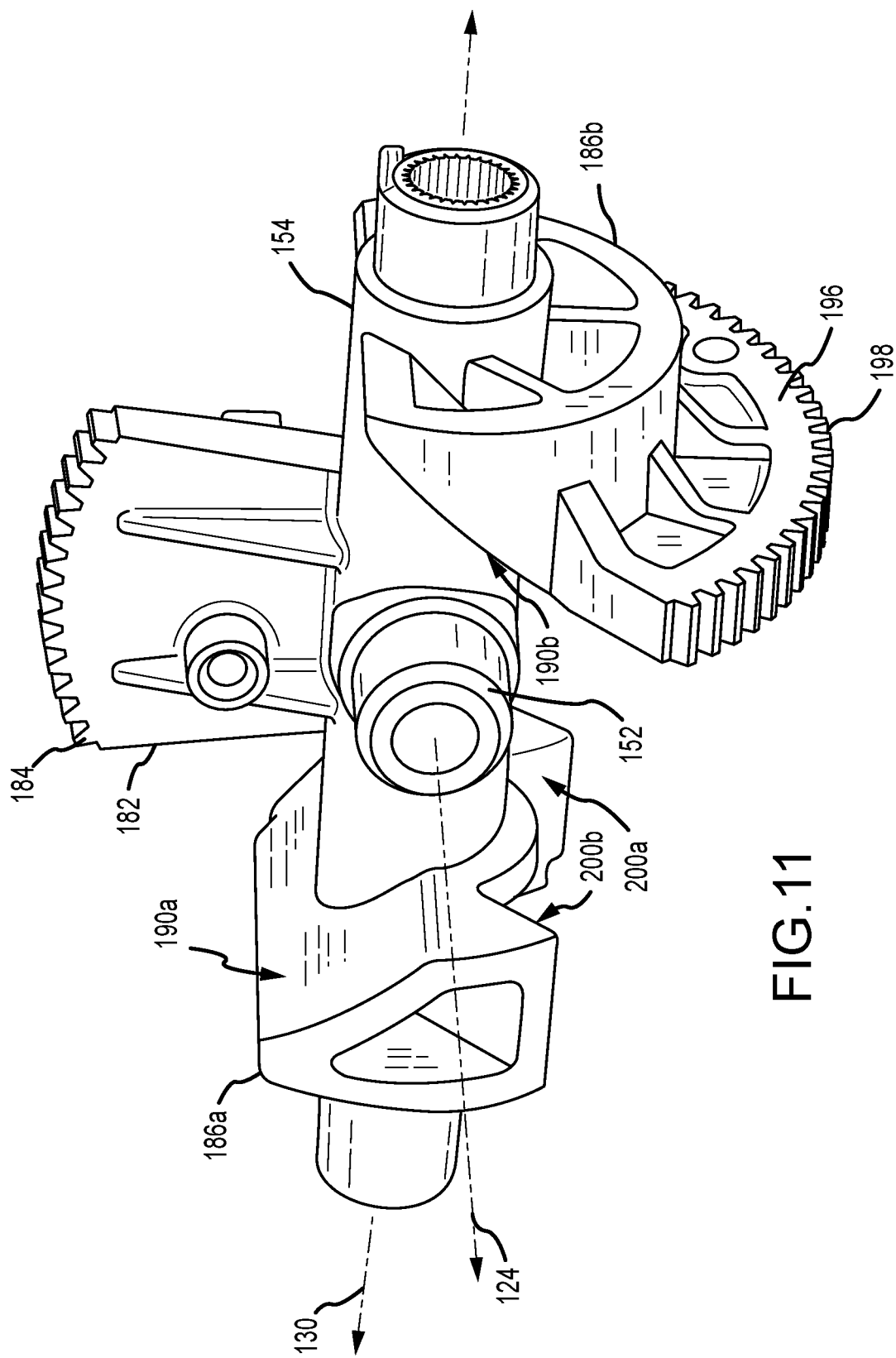
FIG. 11 is a perspective view of a sagittal axle and a frontal axle.

FIG. 11 is a perspective view of the sagittal axle 152 and the frontal axle 154. As described above, the arm structure 140 (shown in FIG. 3) rotationally couples to the sagittal axle 152 and rotates about the sagittal axis 124, while the frontal axle 154 rotationally couples to the chassis 158 (shown in FIG. 9) and rotates about the frontal axis 130. The sagittal axle 152 extends radially from the frontal axle 154 so that upon rotation of the frontal axle 154 about the frontal axis 130, the sagittal axle 152 and the components coupled thereto also rotate. The first flange 182 extends axially along the frontal axle 154 and is centered about the sagittal axle 152. The first flange 182 includes the first rack 184 that enables the sagittal drive assembly 180 (shown in FIG. 5) to drive rotation about the sagittal axis 124.

The pair of first stop projections 186 are disposed on either side of the first flange 182 and the sagittal axle 152. Each first stop projection 186 includes the first oblique surface 190 that defines the rotation range of the rolling or tilting motion of the head housing 102 (shown in FIG. 1). The first stop projection 186a also includes the pair of second oblique surfaces 200 that defines the rotation range of the pitching motion of the head housing. The first stop projection 186b also includes the second flange 196 that extends radially from the frontal axle 154 and has the second rack 198 that enables the frontal drive assembly 194 (shown in FIG. 7) to drive rotation about the frontal axis 130. By combining the sagittal axle 152 and the frontal axle 154 into one unitary component, the configuration provides a relatively high gear ratio (e.g., facilitate a large range of motion) in a compact space within the head housing.

Figure 12:
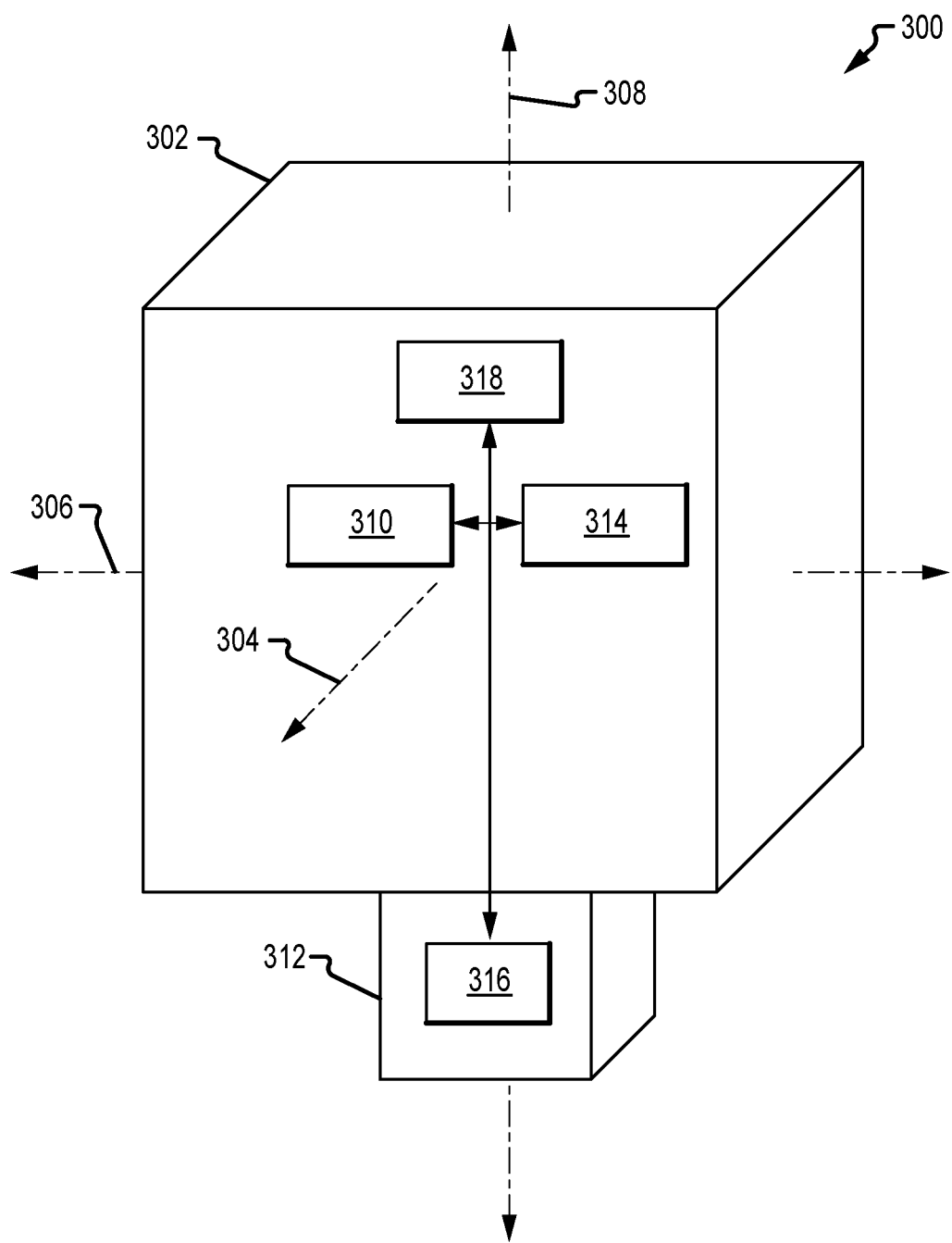
FIG. 12 is a schematic view of another neck mechanism.

FIG. 12 is a schematic view of robotic apparatus 300. In the example described above, the movement of the head of the robotic apparatus is driven substantially by a plurality of interconnected spur gears for independent movement about three different axes. In the example illustrated in FIG. 12, however, a head 302 of the robotic apparatus 300 can be driven by any other means that enable the head 302 to independently move about a roll axis 304 (e.g., also referred to as a tilt or sagittal axis) and is the axis that the head 302 rotates about for tilting motion, a pitch axis 306 (e.g., also referred to as a up-and-down or frontal axis) and is the axis that the head 302 rotates about for up and down motion, and a yaw axis 308 (e.g., also referred to as a side-to-side or vertical axis) and is the axis that the head 302 rotates about for left and right motion.

To rotate the head 302 about the roll axis 304, the robotic apparatus 300 includes a roll driving means 310. The roll driving means 310 can be disposed within the head 302 and independently rotate the head 302 relative to a neck 312 around the roll axis 304 no matter what position the head 302 is in relative to the other two axes 306, 308. To rotate the head 302 about the pitch axis 306, the robotic apparatus 300 includes a pitch driving means 314. The pitch driving means 314 can be disposed within the head 302 and independently rotate the head 302 relative to the neck 312 around the pitch axis 306 no matter what position the head 302 is in relative to the other two axes 304, 308. To rotate the head 302 about the yaw axis 308, the robotic apparatus 300 includes a yaw drive means 316. The yaw drive means 316 can be disposed within the neck 312 and independently rotate the head 302 relative to the neck 312 around the yaw axis 308 no matter what position the head 302 is in relative to the other two axes 304, 306.

In the example, the roll driving means 310 and the pitch driving means 314 are both disposed in the head 302 and positioned above the yaw drive means 316. By disposing the yaw drive means 316 within the neck 312, the center of gravity of the neck mechanism is lowered so that the robotic apparatus 300 does not tip over during operation. Furthermore, by moving at least some of the driving means out of the head 302, more space in the head 302 is available for other components like display screens, cameras, LED lights, etc.

In operation, each of the driving means 310, 314, and 316 are connected to a controller system 318 so that the head 302 can move independently about all three axes 304, 306, and 308. Each driving means 310, 314, and/or 316 can be interconnected spur gears as described in the example above. Additionally or alternatively, the driving means 310, 314, and 316 may include interconnected helical gears, gear sets that are configured to change the orientation of rotational movement (e.g., bevel gears, miter gears, worm and worm gears, screw gears, etc.), belt drives, rope, cable, or chain drives, or any other equivalent mechanical drive assembly that enables the rotation of the head 302 about the axes 304, 306, and 308 as described herein. In some examples each driving means 310, 314, and 316 may be the same type of mechanical drive assembly. In other examples, one or more of the driving means 310, 314, and 316 may be a different type of mechanical drive assembly than the other(s). By using different driving means, other drive assembly benefits may be realized that increase performance of the robotic apparatus. For example, use of belt drives decreases the audible noise of the drive assembly during operation. In another example, use of worm and worm gears may decrease the space needed for the driving means within the head and/or neck. In still another example, use of helical gears increases torque transfer of the driving means.

Figure 13:
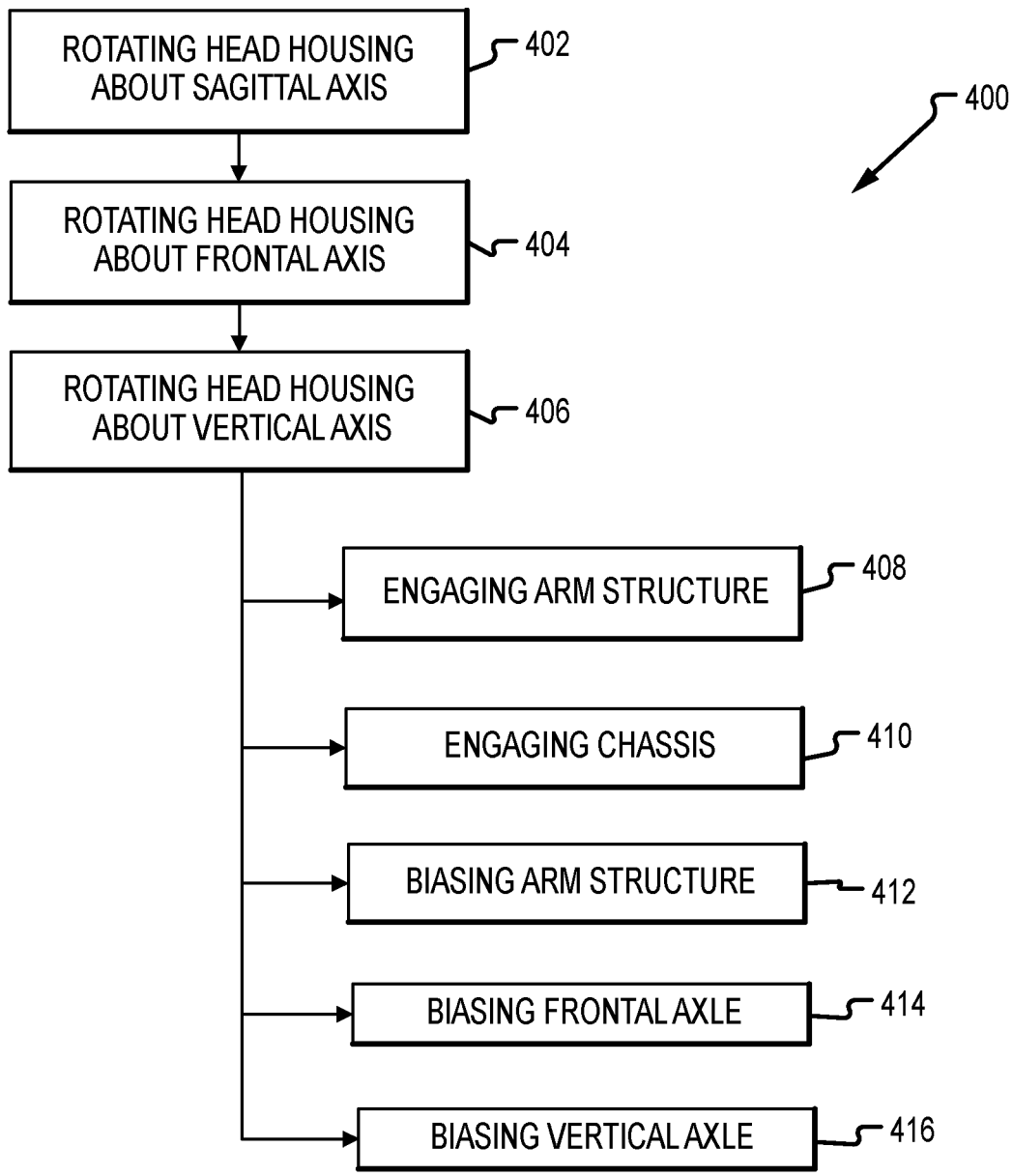
FIG. 13 illustrates a flowchart of a method of moving a head housing in relation to a neck housing of a robotic apparatus.

FIG. 13 illustrates a flowchart of a method 400 of moving a head housing in relation to a neck housing of a robotic apparatus relative to three separate axes. The method 400 includes selectively rotating the head housing about a sagittal axle that defines a sagittal axis by driving rotation of an arm structure coupled to the sagittal axle (operation 402). The arm structure supports the head housing and the sagittal axle is disposed at least partially within the head housing. The head housing is also selectively rotated about a frontal axle that defines a frontal axis by driving rotation of the frontal axle (operation 404). The sagittal axle is coupled to the frontal axle and the frontal axle is also disposed at least partially within the head housing. The head housing is also selectively rotated about a vertical axle that defines a vertical axis by driving rotation of the vertical axle (operation 406). The vertical axle is disposed at least partially within the neck housing and supports the frontal axle. The vertical axle is also offset from the sagittal axle and the frontal axle along the vertical axis. This configuration enables the head housing to independently move in relation to all three axes and perform complex movements by moving from one position to another without needing to return to any center position, thereby realistically mimicking human or animal movement.

In some examples, the sagittal axle is coupled to the frontal axis such that when the frontal axle rotates, the arm structure rotates about the frontal axis. Additionally, the frontal axle is rotatably supported by a chassis coupled to the vertical axle such that when the vertical axle rotates, the arm structure and the frontal axle rotate about the vertical axis. In other examples, the method 400 may include engaging the arm structure with at least one stop projection extending from the frontal axle to prevent over-rotation of the arm structure (operation 408) and engaging the at least one stop projection with a chassis to prevent over-rotation for the frontal axle (operation 410). The stop projections define the rotation range along the sagittal axis and the frontal axis to generate more anatomical-like movement of the head housing. The vertical axle may also include hard stop locations as required or desired.

In other examples, the method 400 may include biasing the arm structure about the sagittal axle (operation 412) such that the arm structure automatically returns to a center position bout the sagittal axis. The frontal axle is also biased about the frontal axis (operation 414) such that the frontal axle automatically returns to a center position about the frontal axis. The vertical axle is also biased about the vertical axis (operation 416) such that the vertical axle automatically returns to a center position about the vertical axis. The biasing step enables the head housing to automatically return to a centered positions if, for example, the head housing is manually moved by the user/operator.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Although specific examples were described herein, the scope of the technology is not limited to those specific examples. One skilled in the art will recognize other examples or improvements that are within the scope of the present technology. Therefore, the specific structure, acts, or media are disclosed only as illustrative examples. Examples according to the technology may also combine elements or components of those that are disclosed in general but not expressly exemplified in combination, unless otherwise stated herein. The scope of the technology is defined by the following claims and any equivalents therein.

What is claimed is:

1. A robotic apparatus comprising:
a neck housing;
a head housing extending from the neck housing, wherein the head housing comprises:
  a front section and an opposite rear section, wherein a sagittal axis extends substantially horizontally from the front section towards the rear section;
  a right section and an opposite left section, wherein a frontal axis extends substantially horizontally from the right section towards the left section; and
  an upper section and an opposite lower section, wherein a vertical axis extends substantially vertically from the upper section towards the lower section; and
a drive assembly disposed at least partially within the neck housing and the head housing, wherein the drive assembly is configured to move the head housing relative to the neck housing independently about the sagittal axis, the frontal axis, and the vertical axis such that the head housing has a range of motion that substantially corresponds to a human or animal head, and wherein the drive assembly comprises:
  a unitary gimbal component, comprising:
    a sagittal axle subcomponent extending along the sagittal axis; and
    a frontal axle subcomponent rotatable about the frontal axis; and
  a vertical axle rotatable about the vertical axis, wherein the vertical axle is disposed at least partially within the neck housing and offset from both the sagittal axle and the frontal axle along the vertical axis.

2. The robotic apparatus of claim 1, wherein the head housing is biased about the sagittal axis, the frontal axis, and the vertical axis so as to automatically return to a centered position with respect to the neck housing.

3. The robotic apparatus of claim 2, wherein the head housing is moveable from a first position defined by the sagittal axis, the frontal axis, and the vertical axis towards a different second position defined by the sagittal axis, the frontal axis, and the vertical axis without being required to return to the centered position.

4. The robotic apparatus of claim 1, wherein the drive assembly further comprises a chassis coupled to the vertical axle, and wherein the unitary gimbal component is rotatably supported by the chassis.

5. The robotic apparatus of claim 4, wherein the unitary gimbal component comprises at least one stop projection configured to engage with the chassis and define an angular rotation range about the frontal axis.

6. The robotic apparatus of claim 4, further comprising a biasing member coupled between the unitary gimbal component and the chassis.

7. The robotic apparatus of claim 4, wherein the drive assembly further comprises an arm structure rotatable about the sagittal axis and configured to support the head housing.

8. The robotic apparatus of claim 7, wherein the unitary gimbal component comprises at least one stop projection configured to engage with the arm structure and define an angular rotation range of the arm structure.

9. The robotic apparatus of claim 7, further comprising a biasing member coupled between the sagittal axle subcomponent and the arm structure.

10. The robotic apparatus of claim 7, wherein the drive assembly further comprises:
  a sagittal motor coupled to the sagittal axle subcomponent by a sagittal transmission and configured to rotate the arm structure about the sagittal axis;
  a frontal motor coupled to the frontal axle subcomponent by a frontal transmission and configured to rotate the unitary gimbal component about the frontal axis; and
  a vertical motor coupled to the vertical axle by a vertical transmission and configured to rotate the vertical axle.

11. The robotic apparatus of claim 10, wherein at least one of the sagittal transmission, the frontal transmission, and the vertical transmission comprises a gear set.

12. The robotic apparatus of claim 10, wherein the sagittal motor is supported by the arm structure, and wherein the frontal motor is supported by the chassis.

13. The robotic apparatus of claim 10, wherein the sagittal motor and the frontal motor are disposed within the head housing and positioned above the vertical motor.

14. The robotic apparatus of claim 1, wherein the vertical axle comprises at least one stop projection defining an angular rotation range of the vertical axle.

15. A method of moving a head housing in relation to a neck housing of a robotic apparatus relative to three separate axes, the method comprising:
selectively rotating the head housing about a sagittal axle that defines a sagittal axis by driving rotation of an arm structure coupled to a sagittal axle subcomponent of a unitary gimbal component, wherein the arm structure supports the head housing, and wherein the sagittal axle subcomponent defines the sagittal axis and is disposed at least partially within the head housing;

selectively rotating the head housing about a frontal axis by driving rotation of a frontal axle subcomponent of the unitary gimbal component, wherein the frontal axle subcomponent is disposed at least partially within the head housing; and selectively rotating the head housing about a vertical axle that defines a vertical axis by driving rotation of the vertical axle, wherein the vertical axle is disposed at least partially within the neck housing and supports the unitary gimbal component, and wherein the vertical axle is offset from the sagittal axle subcomponent and the frontal axle subcomponent along the vertical axis.

16. The robotic apparatus of claim 1, wherein the unitary gimbal component further comprises one or more of:
a sagittal hard stop subcomponent that defines a range of motion about the sagittal axis;
a frontal hard stop subcomponent that defines a range of motion about the frontal axis;
a sagittal final gear subcomponent configured to cause rotation of the unitary gimbal subcomponent about the sagittal axis; or
a frontal final gear subcomponent configured to cause rotation of the unitary gimbal component about the frontal axis.

17. The method of claim 15, wherein, when the frontal axle subcomponent rotates, the arm structure rotates about the frontal axis, and wherein the unitary gimbal component is rotatably supported by a chassis coupled to the vertical axle such that when the vertical axle rotates, the arm structure and the frontal axle subcomponent rotate about the vertical axis.

18. The method of claim 15, further comprising:
engaging the arm structure with at least one stop projection extending from the frontal axle subcomponent to prevent over-rotation of the arm structure; and
engaging the at least one stop protection projection with a chassis to prevent over-rotation about the frontal axis.

19. The method of claim 15 further comprising:
biasing the arm structure about the sagittal axle subcomponent such that the arm structure automatically returns to a center position about the sagittal axis;
biasing the frontal axle subcomponent about the frontal axis such that the frontal axle subcomponent automatically returns to a center position about the frontal axis; and
biasing the vertical axle about the vertical axis such that the vertical axle automatically returns to a center position about the vertical axis.

20. A robotic apparatus comprising:
a neck;
a head extending from the neck; and
a drive assembly disposed at least partially within the neck and the head, wherein the drive assembly comprises:
means for independently moving the head about a roll axis of the head, the roll axis defined by a roll subcomponent of a unitary gimbal component;
means for independently moving the head about a pitch axis of the head, the pitch axis defined by a pitch subcomponent of the unitary gimbal component; and
means for independently moving the head about a yaw axis of the head, wherein the means for moving the head about the yaw axis is disposed at least partially within the neck and offset from the means for moving the head about the roll axis and the means for moving the head about the pitch axis.

* * * * *